US010462262B2

(12) United States Patent
Parekh et al.

(10) Patent No.: US 10,462,262 B2
(45) Date of Patent: Oct. 29, 2019

(54) MIDDLEWARE ABSTRACTION LAYER (MAL)

(71) Applicants: Devang R. Parekh, San Diego, CA (US); Paul Schaefer, San Diego, CA (US); Feng Cao, San Diego, CA (US); Jason Chinaka, Escondido, CA (US); Benjamin Montgomery, San Diego, CA (US); Long Cao, San Diego, CA (US); Kathleen Barrera, San Diego, CA (US); Henry H. Fung, San Diego, CA (US); Louis Oddo, Carlsbad, CA (US)

(72) Inventors: Devang R. Parekh, San Diego, CA (US); Paul Schaefer, San Diego, CA (US); Feng Cao, San Diego, CA (US); Jason Chinaka, Escondido, CA (US); Benjamin Montgomery, San Diego, CA (US); Long Cao, San Diego, CA (US); Kathleen Barrera, San Diego, CA (US); Henry H. Fung, San Diego, CA (US); Louis Oddo, Carlsbad, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 621 days.

(21) Appl. No.: 14/989,618

(22) Filed: Jan. 6, 2016

(65) Prior Publication Data
US 2017/0195458 A1   Jul. 6, 2017

(51) Int. Cl.
*H04L 29/06* (2006.01)
*H04L 29/08* (2006.01)
*G06F 9/54* (2006.01)

(52) U.S. Cl.
CPC .............. *H04L 67/34* (2013.01); *G06F 9/547* (2013.01)

(58) Field of Classification Search
CPC ................................. H04L 67/34; G06F 9/547
(Continued)

(56) References Cited

U.S. PATENT DOCUMENTS 5,740,423 A * 4/1998 Logan ............... G06F 17/30545
8,671,135 B1 * 3/2014 Joshi ................... H04L 41/0893
365/200

(Continued)

OTHER PUBLICATIONS

Gigan, et al. : "Sensor Abstraction Layer: A Unique Software Interface to Effectively Manage Sensor Networks"; Intelligent Sensors, Sensor Networks and Information, 2007. ISSNIP 2007. 3rd International Conference on. IEEE, 2007.
(Continued)

*Primary Examiner* — Moustafa M Meky
*Assistant Examiner* — Elizabeth Kassa
(74) *Attorney, Agent, or Firm* — Tarolli, Sundheim, Covell & Tummino

(57) ABSTRACT

A middleware abstraction layer (MAL) that can include a plurality of middleware application programming interfaces (APIs). Each of the plurality of middleware APIs can be configured to implement a common programming paradigm for a plurality of different service platforms. The MAL can also include a master application programming interface (API). The master API can be configured to provide a plurality of resources for a mission specific application. Each of the plurality of resources is mapped in a registry to an API call to each of the plurality of middleware APIs. The MAL can further include a control engine configured to load an adapter for a selected a middleware API of the plurality of middleware APIs to service a resource request from the mission specific application. The selection can include
(Continued)

examining a configuration file to determine an appropriate middleware API to handle the resource request.

20 Claims, 22 Drawing Sheets

(58) Field of Classification Search
USPC .......................................................... 709/219
See application file for complete search history.

(56) References Cited

U.S. PATENT DOCUMENTS

| | | | |
|---|---|---|---|
| 2006/0129560 A1 | 6/2006 | Adams et al. | |
| 2006/0159077 A1* | 7/2006 | Vanecek, Jr. | G06F 8/30 370/360 |
| 2006/0168331 A1* | 7/2006 | Thompson | G06F 9/542 709/238 |
| 2006/0227950 A1* | 10/2006 | Mielich | H04L 29/06 379/142.14 |
| 2007/0112574 A1* | 5/2007 | Greene | G06F 9/5072 340/572.1 |
| 2007/0235537 A1* | 10/2007 | Yoneda | G06F 13/102 235/435 |
| 2009/0234903 A1* | 9/2009 | Lomelli | G06F 9/5055 709/201 |
| 2011/0023053 A1* | 1/2011 | Gathman | G06F 9/465 719/320 |
| 2011/0246535 A1* | 10/2011 | Freeman | G06F 17/30566 707/803 |
| 2012/0259909 A1* | 10/2012 | Bachelor | G06N 3/02 709/201 |
| 2014/0201418 A1* | 7/2014 | Turner | H04L 67/42 710/313 |
| 2015/0074279 A1* | 3/2015 | Maes | G06F 9/5072 709/226 |

OTHER PUBLICATIONS

Mohamed, et al.:"*Middleware for robotics: A survey*" Robotics, Automation and Mechatronics, 2008 IEEE Conference on. IEEE, 2008.

Smart: "*Is a common middleware for robotics possible?*" Proceedings of the IROS 2007 workshop on Measures and Procedures for the Evaluation of Robot Architectures and Middleware. 2007.

* cited by examiner

155 →

+ getQosProfileFromSubscriber(String): String
+ getReplier(String): GenericReplier
+ getRequester(String): GenericRequester
+ getSubscriber(String): GenericSubscriber
+ getTopoic(String): GenericTopic
+ getTypeSupport(String): GenericTypeSupportImpl
+ MAL_DDS_Abstraction()
registerTypeSupport(String, GenericTypeSupportImpl): void <<property get>>
+ getContentFilteredTopicMap(): ConcurrentHashMap<String, GenericContentFilteredTopic>
+ getDataReaderMap(): ConcurrentHashMap<String, GenericDataReader>
+ getDataWriterMap(): ConcurrentHashMap<String, GenericDataWriter>
+ getParticpantMap(): ConcurrentHashMap<String, GenericDomainParticipant>
+ getPublisherMap(): ConcurrentHashMap<String, GenericPublisher>
+ getPublisherQosLibraryAndProfileMap(): ConcurrentHashMap<String, String>
+ getReplierMap(): ConcurrentHashMap<String, GenericReplier>
+ getRequesterMap(): ConcurrentHashMap<String, GenericRequester>
+ getSubscriberMap(): ConcurrentHashMap<String, GenericSubscriber>
+ getSubscriberQosLiberaryAndProfileMap(): ConcurrentHashMap<String, String>
+ getTopicMap(): ConcurrentHashMap<String, GenericTopic>
+ getTypeSupportMap(): ConcurrentHashMap<String, GenericTypeSupportImp>

FIG. 4B

| Method Name | Output Type | Param 1 Type | Param 1 Name | Param 2 Type | Param 2 Name | Param 3 Type | Param 3 Name |
|---|---|---|---|---|---|---|---|
| GetName | String | | | | | | |
| Put | void | KEY | key | VALUE | value | | |
| PutIfAbsent | boolean | KEY | key | VALUE | value | | |
| PutAll | void | Map<? Extends KEY, ? Extends VALU | map | | | | |
| Replace | boolean | KEY | key | VALUE | value | | |
| Replace | boolean | KEY | key | VALUE | oldValue | VALUE | newValue |
| Get | VALUE | KEY | key | | | | |
| GetAll | Map<KEY, VALUE> | Set<KEY> | keySet | | | | |
| Remove | boolean | KEY | key | | | | |
| Remove | boolean | KEY | key | VALUE | oldValue | | |
| RemoveAll | void | Set<KEY> | keySet | | | | |
| KeySet | Set<KEY> | | | | | | |
| ContainsKey | boolean | KEY | key | | | | |
| Lock | VALUE | KEY | key | | | | |
| Unlock | void | KEY | key | | | | |
| AttachListener | void | GridSpaceListener<KEY, VALUE> | listener | | | | |
| AttachKeyListener | void | GridSpaceListener<KEY, VALUE> | listener | KEY | key | | |
| DetachListener | void | GridSpaceListener<KEY, VALUE> | listener | | | | |
| Query | List<VALUE> | String | queryString | | | | |
| GridSpaceProcess | Future<List<T>> | GridSpaceProcessor<KEY, VALUE, T> | processor | | | | |
| GridSpaceProcess | Future<List<T>> | GridSpaceProcessor<KEY, VALUE, T> | processor | int | maxResults | | |

FIG. 9

| MAL Method Name | Activespaces method needed | Output | Param 1 Type | Param 1 Name | Param 2 Type | Param 2 Name | Param 3 Type | Param 3 Name |
|---|---|---|---|---|---|---|---|---|
| GetName | none | | | | | | | |
| Put | space.put | void | Tuple | | | | | |
| PutIfAbsent | get | | | | | | | |
| | put | | | | | | | |
| PutAll | put | | | | | | | |
| Replace | get | | | | | | | |
| | put | | | | | | | |
| Replace | space.compareAndPut | Tuple | Tuple | oldTuple | Tuple | newTuple | | |
| Get | space.get | Tuple | Tuple | tuple | | | | |
| GetAll | get | VALUE | KEY | key | | | | |
| Remove | space.take | Tuple | Tuple | keyTuple | | | | |
| Remove | space.compareAndTake | Tuple | Tuple | oldTuple | | | | |
| RemoveAll | space.takeAll | SpaceResultList | Collection<Tuple> | keyTuples | TakeOptions | takeAllOptions | | |
| KeySet | queryEntries | | | | | | | |
| ContainsKey | get | | | | | | | |
| Lock | space.lock | Tuple | Tuple | keyTuple | | | | |
| Unlock | space.unlock | Tuple | Tuple | keyTuple | | | | |
| AttachListener | space.listen | Listener | Listener | listener | ListenerDef | listenerDef | | |
| AttachKeyListener | space.listen | Listener | Listener | listener | ListenerDef | listenerDef | | |
| DetachListener | space.stopListener | void | Listener | listener | | | | |
| Query | space.browse | Browser | BrowserType | BrowserType.G | BrowserDef | browserDef | String | queryString |
| GridSpaceProcess | space.invokeSeeders | InvokeResultList | String | arg0 | InvokeOption | options | | |
| GridSpaceProcess | space.invokeSeeders | InvokeResultList | String | arg0 | InvokeOption | options | | |

FIG. 10

| MAL Method Name | Coherence method needed | Output | Param 1 Type | Param 1 Name | Param 2 Type | Param 2 Name | Param 3 Type | Param 3 Name |
|---|---|---|---|---|---|---|---|---|
| GetName | | | | | | | | |
| Put | coherenceNamedCache.put | void | KEY | key | VALUE | value | | |
| PutIfAbsent | coherenceNamedCache.containsKey | boolean | KEY | key | | | | |
| | coherenceNamedCache.put | boolean | KEY | key | | | | |
| PutAll | coherenceNamedCache.putAll | boolean | Map<? Extends m | | | | | |
| Replace | containKey | | | | | | | |
| | coherenceNamedCache.put | void | KEY | key | VALUE | value | | |
| Replace | | | | | | | | |
| Get | coherenceNamedCache.get | VALUE | KEY | key | | | | |
| GetAll | coherenceNamedCache.getAll | Map<KEY,VALUE> | Set<KEY> | keySet | | | | |
| Remove | coherenceNamedCache.remove | boolean | KEY | key | | | | |
| Remove | | | | | | | | |
| RemoveAll | coherenceNamedCache.removeAll | void | Set<KEY> | keySet | | | | |
| KeySet | coherenceNamedCache.getAllKeys | Set<KEY> | | | | | | |
| ContainsKey | coherenceNamedCache.containsKey | boolean | KEY | key | | | | |
| Lock | coherenceNamedCache.lock | VALUE | KEY | key | | | | |
| Unlock | coherenceNamedCache.unlock | void | KEY | key | | | | |
| AttachListener | listenerRegistry.put | void | GridSpaceList | hash | MapListener | addToCache | | |
| | coherenceNamedCache.addMapListener | void | MapListener | addToCache | | | | |
| AttachKeyListener | listenerRegistry.put | void | GridSpaceList | hash | MapListener | addToCache | | |
| | coherenceNamedCache.addMapListener | void | MapListener | addToCache | KEY | key | boolean | boolean |
| DetachListener | coherenceNamedCache.removeMapListener | void | MapListener | toRemove | | | | |
| Query | coherenceNamedCache.getAll | Map<KEY,VALUE> | Set<KEY> | queryFilter | | | | |
| GridSpaceProcess | coherenceNamedCache.invokeAll | Map<KEY, RESULT> | Filter | AlwaysFilter.IN | EntryProcessor | entryProcessor | | |
| GridSpaceProcess | coherenceNamedCache.invokeAll | Map<KEY, RESULT> | Filter | AlwaysFilter.IN | EntryProcessor | entryProcessor | | |

FIG. 11

| MAL Method Name | Gemfire method needed | Output | Param 1 Type | Param 1 Name | Param 2 Type | Param 2 Name | Param 3 Type | Param 3 Name |
|---|---|---|---|---|---|---|---|---|
| GetName | none | | | | | | | |
| Put | region.put | void | KEY | key | VALUE | value | | |
| PutIfAbsent | region.putIfAbsent | VALUE | KEY | key | VALUE | value | | |
| PutAll | region.putAll | void | Map<? Extends KEY, ? Extends VALUE> | map | | | | |
| Replace | region.replace | boolean | KEY | key | VALUE | value | | |
| Replace | region.replace | boolean | KEY | key | VALUE | oldValue | VALUE | newValue |
| Get | region.get | VALUE | KEY | key | | | | |
| GetAll | region.containsKey | Map<KEY,VALUE> | Set<KEY, VALUE> | keySet | | | | |
| Remove | region.remove | boolean | KEY | key | | | | |
| Remove | region.remove | boolean | KEY | key | VALUE | oldValue | | |
| RemoveAll | region.remove | void | KEY | key | | | | |
| KeySet | region.keySet | Set<KEY | | | | | | |
| ContainsKey | region.containsKey | boolean | KEY | key | | | | |
| Lock | none | | | | | | | |
| Unlock | none | | | | | | | |
| AttachListener | none | | | | | | | |
| AttachKeyListener | none | | | | | | | |
| DetachListener | none | | | | | | | |
| Query | region.getRegionService.newC | SelectResults | String | queryString | | | | |
| GridSpaceProcess | FunctionService.onRegion | ResultCollector< | Region | region | Filter | filterOptions | | |
| GridSpaceProcess | FunctionService.onRegion | ResultCollector< | Region | region | Filter | filterOptions | | |

FIG. 12

| MAL Method Name | Hazelcast method needed | Output | Param 1 Type | Param 1 Name | Param 2 Type | Param 2 Name | Param 3 Type | Param 3 Name |
|---|---|---|---|---|---|---|---|---|
| GetName | none | | | | | | | |
| Put | hazelcastMap.put | void | KEY | key | VALUE | value | | |
| PutIfAbsent | hazelcastMap.putIfAbsent | boolean | KEY | key | VALUE | value | | |
| PutAll | hazelcastMap.putAll | void | Map<? Extends KEY, ? Extends VALUE> | m | | | | |
| Replace | hazelcastMap.replace | boolean | KEY | key | VALUE | value | | |
| Replace | hazelcastMap.containsKey | boolean | KEY | key | | | | |
| | hazelcastMap.put | void | KEY | key | VALUE | value | | |
| Get | hazelcastMap.get | VALUE | KEY | key | | | | |
| GetAll | hazelcastMap.getAll | Map<KEY,VALUE> | Set<KEY> | keySet | | | | |
| Remove | hazelcastMap.remove | VALUE | KEY | key | | | | |
| Remove | hazelcastMap.remove | boolean | KEY | key | VALUE | oldValue | | |
| RemoveAll | hazelcastMap.remove | VALUE | KEY | key | | | | |
| KeySet | hazelcastMap.keySey | Set<KEY> | | | | | | |
| ContainsKey | hazelcastMap.containsKey | boolean | KEY | key | | | | |
| Lock | hazelcastMap.lock | VALUE | KEY | key | | | | |
| Unlock | hazelcastMap.unlock | void | KEY | key | | | | |
| AttachListener | hazelcastMap.addEntryListener | String | EntryListener | listener | boolean | bool | | |
| AttachKeyListener | hazelcastMap.addEntryListener | String | EntryListener | listener | KEY | key | boolean | bool |
| DetachListener | hazelcastMap.removeEntryList | boolean | String | id | | | | |
| Query | hazelcastMap.entrySet | Set<Entry<KEY,VA | Predicate | sqlPredicate | | | | |
| GridSpaceProcess | Hazelcast.getAllHazelcastInsan | Set<HazelcastInstances> | | | | | | |
| | hazelcastMap.localKeySet | Set<Object> | | | | | | |
| | hazelcastMap.get | VALUE | KEY | key | | | | |
| GridSpaceProcess | Hazelcast.getAllHazelcastInsan | Set<HazelcastInstances> | | | | | | |
| | hazelcastMap.localKeySet | Set<Object> | | | | | | |
| | hazelcastMap.get | VALUE | KEY | key | | | | |

FIG. 13

| MAL Method Name | Infinispan method needed | Output | Param 1 Type | Param 1 Name | Param 2 Type | Param 2 Name | Param 3 Type | Param 3 Name |
|---|---|---|---|---|---|---|---|---|
| GetName | none | | | | | | | |
| Put | cache.put | void | KEY | key | VALUE | value | | |
| PutIfAbsent | cache.putIfAbsent | boolean | KEY | key | VALUE | value | | |
| PutAll | cache.putAll | void | Map<? Extends KEY, ? Extends VALUE> | m | | | | |
| Replace | cache.replace | boolean | KEY | key | VALUE | value | | |
| Replace | cache.replace | boolean | KEY | key | VALUE | oldValue | VALUE | newValue |
| Get | cache.get | VALUE | KEY | key | | | | |
| GetAll | cache.containsKey | KEY | KEY | key | | | | |
| | cache.get | VALUE | KEY | key | | | | |
| Remove | cache.remove | boolean | KEY | key | | | | |
| Remove | cache.remove | boolean | KEY | key | VALUE | oldValue | | |
| RemoveAll | cache.remove | boolean | KEY | key | | | | |
| KeySet | cache.keySet | Set<KEY> | | | | | | |
| ContainsKey | cache.containsKey | boolean | KEY | key | | | | |
| Lock | cache.getAdvancedCache.lock | VALUE | KEY | key | | | | |
| Unlock | cache.getAdvancedCache.getLockManager | LockManager | | | | | | |
| | lockManager.unlock | void | Collection<Object> | keys | Object | lockOwner | | |
| AttachListener | cache.addListener | void | Object | infinispanListener | | | | |
| AttachKeyListener | cache.addListener | void | Object | infinispanListener | KeyFilter | keyFilter | | |
| DetachListener | cache.removeListener | void | Object | infinispanListener | | | | |
| Query | parser.parse | Query | String | queryString | | | | |
| | searchManager.getQuery | CacheQuery | Query | fullTextQuery | | | | |
| GridSpaceProcess | distExec.submitEverywhere | <T> List | Callable <T> | callable | | | | |
| GridSpaceProcess | distExec.submitEverywhere | <T> List | Callable <T> | callable | | | | |

FIG. 14

```
import com.ngc.ncta.mal.datagrid.product.activespace.ActiveSpacesGridManager;
import com.ngc.ncta.mal.datagrid.product.hazelcast.HazelcastGridManager;
import com.ngc.ncta.mal.datagrid.factory.GridProducts;
import com.ngc.ncta.mal.configuration.types.DataGridConfiguration;
import com.ngc.ncta.mal.configuration.types.JmsConfiguration;
import com.ngc.ncta.mal.configuration.types.DDSConfiguration;
import com.ngc.ncta.mal.configuration.types.UdpConfiguration;
import com.ngc.ncta.mal.configuration.types.TcpConfiguration;
import com.ngc.ncta.mal.configuration.types.SpaceType;

com.ngc.ncta.mal.datagrid.factory {
    managers = new GridProducts[] {
                new GridProducts("ACTIVE_SPACES", new ActiveSpacesGridManager()),
                            new GridProducts("HAZELCAST", new HazelcastGridManager())
    };
} com.ngc.ncta.mal.configuration {
            gridDeployments = new DataGridConfiguration[] {
                            new DataGridConfiguration("Hazelcast",
                                        "HAZELCAST",
                                        "unicast",
                                        new SpaceType[]{
                                                    new SpaceType("ball-space", "java.lang.Integer", "mal.demo.datamodel.DataPackage")
                                        }),
                            new DataGridConfiguration("Activespaces",
                                        "ACTIVE_SPACES",
                                        "multicast",
                                        new SpaceType[]{
                                                    new SpaceType("ball-space", "java.lang.Integer", "mal.demo.datamodel.DataPackage")
                                        })
            };

jmsDeployments = new JmsConfiguration[] {
                            new JmsConfiguration(
                                        "ActiveMQ",
                                        "ACTIVEMQ",
                                        "tcp://localhost:61616",
                                        "TopicConnectionFactory",
                                        "QueueConnectionFactory",
                                        "admin",
                                        "admin"
                            ), new JmsConfiguration(
                                        "OpenMQ",
                                        "OPENMQ",
                                        "file:///C:/Temp",
                                        "TopicConnectionFactory",
                                        "QueueConnectionFactory",
                                        "admin",
                                        "admin"
                            )
            };

ddsDeployments = new DDSConfiguration[] {
                            new DDSConfiguration(
                                        "RTI",
                                        "RTI",
                                        "localhost"
                            )
            };

udpDeployments = new UdpConfiguration[] {
                            new UdpConfiguration(
                                        "UDP",
                                        "224.0.239.255",
                                        44004,
                                        "false"
                            )
            };

tcpDeployments = new TcpConfiguration[] {
                            new TcpConfiguration(
                                        "TCP",
                                        "localhost",
                                        41001
                            )
            };
}
```

MIDDLEWARE ABSTRACTION LAYER (MAL)

TECHNICAL FIELD

This disclosure relates to a middleware abstraction layer (MAL).

BACKGROUND

Middleware is computer software that provides services to software applications beyond those available from the operating system. Middleware makes it easier for software developers to perform communication and input/output, so that programmers can focus on the specific purpose of their application. Middleware is the software that connects software components or enterprise applications. Middleware is the software layer that lies between the operating system and the applications on each side of a distributed computer network.

In computer programming, an application programming interface (API) is a set of routines, protocols, and tools for building software applications. An API expresses a software component in terms of operations, inputs, outputs and underlying types. An API defines functionalities that are independent of their respective implementations, which allows definitions and implementations to vary without compromising the interface.

A programming paradigm is a fundamental style of computer programming, serving as a way of building the structure and elements of computer programs. Capabilities and styles of various programming languages are defined by their supported programming paradigms. For instance, some programming languages are designed to follow only one paradigm, while others support multiple paradigms.

SUMMARY

One example relates to a non-transitory machine readable medium having machine readable instructions. The machine readable instructions can include a middleware abstraction layer (MAL) that can include a plurality of middleware application programming interfaces (APIs). Each of the plurality of middleware APIs can be configured to implement a common programming paradigm for a plurality of different service platforms. The MAL can also include a master application programming interface (API). The master API can be configured to provide a plurality of resources for a mission specific application. Each of the plurality of resources is mapped in a registry to an API call to each of the plurality of middleware APIs. The MAL can further include a control engine configured to load an adapter for a selected a middleware API of the plurality of middleware APIs to service a resource request from the mission specific application. The selection can include examining a configuration file to determine an appropriate middleware API to handle the resource request.

Another example relates to a system that can include a non-transitory memory to store machine readable instructions. The system can also include a processing unit to access the memory and execute the machine readable instructions, the machine readable instructions can include a MAL. The MAL can include a plurality of middleware APIs that are each configured to implement a common programming paradigm for a plurality of different back-end software platforms. The common programming paradigm includes a transport messaging paradigm, an integrated computing mechanism paradigm and an integrated state-based data-centric paradigm. The MAL can also include a master API. The master API can be configured to provide a plurality of resources accessible by a resource request, wherein each of the plurality of resources characterizes a generalized function that is mapped in a registry to an API call for each of the plurality of middleware APIs. The MAL can also include a control engine configured to load an adapter for a selected middleware API of the plurality of middleware APIs to service a resource request from a mission specific application.

A method can include loading, at a MAL executing on one or more computing devices, an adapter of the MAL for a particular middleware API of a plurality of middleware APIs that each implement a multiple versions of a common programming paradigm on corresponding services, wherein the selecting is based on configuration file. The method can also include receiving, at the MAL a resource request. The method can further include converting, at the adapter of the MAL, the resource request into an API call for a particular service of the corresponding services. The method can yet further include generating, at the adapter of the MAL, a response for the resource request in response to an API call response from the particular service.

BRIEF DESCRIPTION OF THE DRAWINGS

FIGS. 4A-4D illustrates an example of a UML diagram characterizing a registry of a Data Distribution Service (DDS) API.

FIG. 9 illustrates an example of a chart characterizing a registry of a Data Grid API.

FIG. 10 illustrates an example of a list of the API calls provided by the Data Grid API mapped to methods employed on a TIBCO® Active Spaces Data Grid.

FIG. 11 illustrates an example of a list of the API calls provided by the Data Grid API mapped to methods employed on an ORACLE® Coherence Data Grid.

FIG. 12 illustrates an example of a list of the API calls provided by the Data Grid API mapped to methods employed on a GEMSTONE™ Gemfire Data Grid.

FIG. 13 illustrates an example of a list of the API calls provided by the Data Grid API mapped to methods employed on a Hazelcast Data Grid.

FIG. 14 illustrates an example of a list of the API calls provided by the Data Grid API mapped to methods employed on a JBoss Infinispan Data Grid.

FIG. 15 illustrates an example of a configuration file for a MAL.

DETAILED DESCRIPTION

This disclosure relates to a middleware abstraction layer (MAL). The MAL can include a master application programming interface (API). The master API can be configured to provide a plurality of resources accessible by a resource request from a program (e.g., a mission specific application). Each of the plurality of resources characterizes a generalized function executable by each of a plurality of middleware APIs of the MAL. Each of the plurality of middleware APIs communicate with adapters of the MAL that are developed for a plurality of vendors of a corresponding plurality of instances of service platforms. Moreover, each of the plurality of middleware APIs is configured to implement a common programming paradigm. The common programming paradigm can be, for example a transport messaging paradigm, an integrated computing mechanism paradigm (e.g., a data grid) or an integrated state-based data-centric paradigm (e.g., a Data Distribution Service). The MAL can include a control engine configured to select a middleware API of the plurality of middleware APIs to service a resource request from the mission specific application.

The master API can send an API call to the selected API based on the resource request. The selected API can forward the API call to an adapter that communicates with a service. The service can generate a response to the API call, which response can be forwarded back to the master API. The master API can provide a response to the resource request to the mission specific application based on the response to the API call. In this manner, the MAL can be configured to "decouple" the mission specific application from reliance on vendor specific features of specific services. Furthermore, the resources provided by the master API can be generalized across all of the plurality of middleware APIs, thereby increasing the portability of code generated for the mission specific application.

Figure 1:
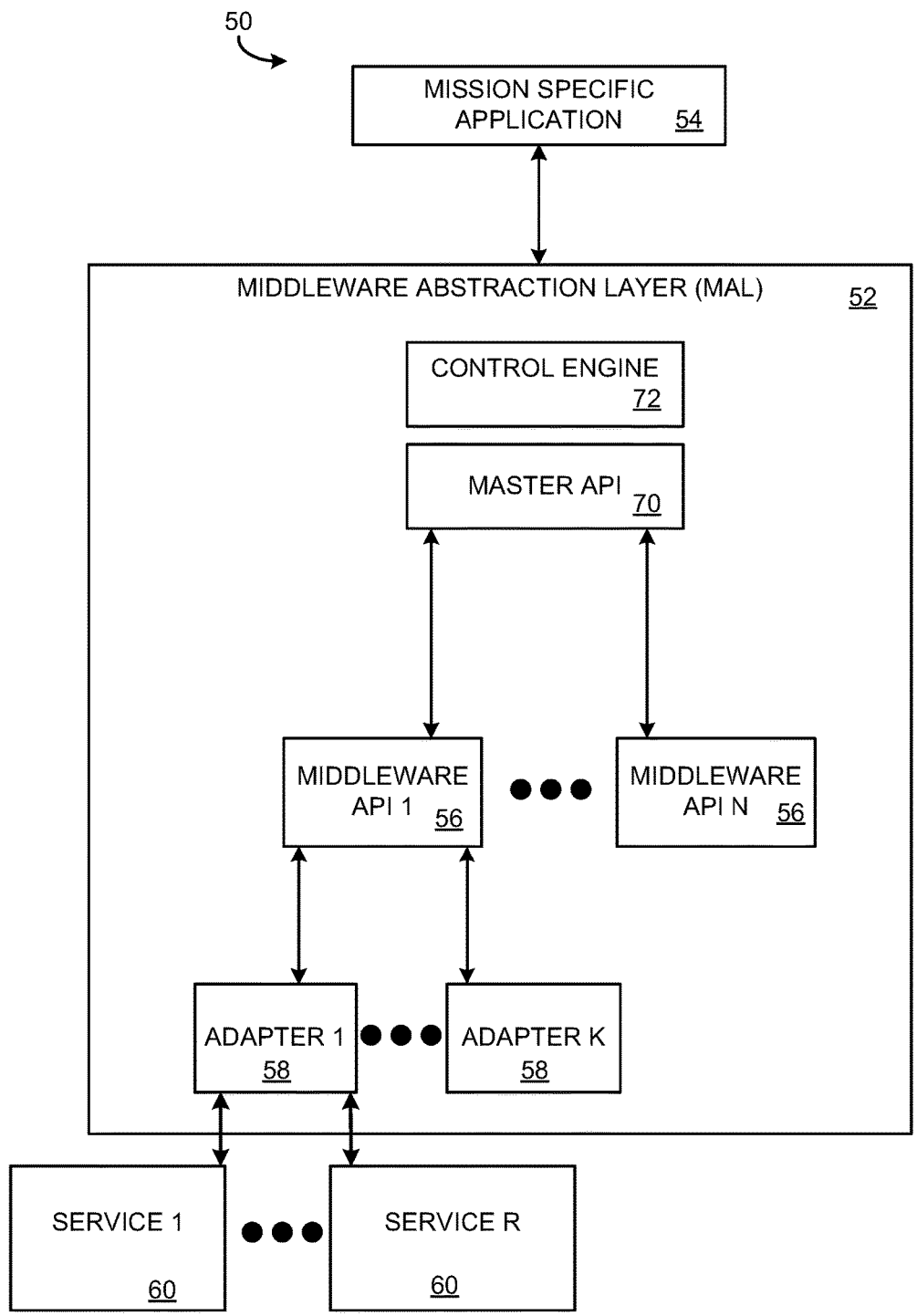
FIG. 1 illustrates an example of a system for implementing a middleware abstraction layer (MAL).

FIG. 1 illustrates an example of a system 50 for implementing a middleware abstraction layer (MAL) 52. The MAL 52 can be a middleware software component that provides a communication/operational channel from a mission specific application 54 to N number of middleware application programming interfaces (APIs) 56 of the MAL 52, where N is an integer greater than or equal to two. The MAL 52 can be implemented as machine executable instructions stored on a non-transitory machine readable medium (volatile or non-volatile). The MAL 52 can be executed by one or more computing devices (e.g., a server).

As used herein, the term "mission specific application" includes front-end software applications (e.g., end-user software applications) as well as server-client applications. Moreover, the mission specific application 54 (and other examples of the mission specific application described throughout this disclosure) could be nearly any software application programming to facilitate completion of a task (e.g., a mission), such as a data or message delivery, strategic mission planning (e.g., which includes map data processing) and/or control of vehicles (or other equipment), including unmanned aircraft vehicles (UAVs).

Each of the N number of middleware APIs 56 can be a set of routines, protocols, and tools for building software applications that implement/actuate a command on a corresponding adapter 58 of the MAL 52 of an instance of a specific lower level software application, which lower level software application can be referred to as a service 60. There can be K number of adapters 58, where K is an integer greater than or equal to one. Each of the K number of adapters 58 can operate as a calling engine for the corresponding middleware API 56. In particular, each adapter 58 is associated with one or more instances of the service 60, such that there is R number of instances of a service 60 for each of the K number of adapters, where R is an integer greater than or equal to one. Each of the R instances of service 60 can be implemented as commercial off-the-shelf (COTS) or open source software. Each of the R number of instances of the service 60 can represent both, an underlying operational platform and a vendor specific and/or standard specific API for executing low-level commands on each of the R number of services 60.

As used herein, the term "service" includes a wide range of software applications and/or platforms that can perform functions in response to a request, including COTS and/or open source services. For example, a given service 60 could be a messaging service, a data storage and retrieval service, etc. Additionally or alternatively, the given service 60 could be a back-end software application, such as a database, an enterprise resource planning (ERP) software package, etc. Moreover, in some instances, the MAL 52 and the service 60 could be operating on the same computing device. In other examples, the service 60 could be representative of a Software as a Service (SaaS) that is accessed remotely (via a network) by the MAL 52.

Each of the N number of middleware APIs 56 can provide a programming interface for a common programming paradigm. That is, each of the N number of middleware APIs 56 is API for different implementations of the same programming paradigm. Moreover, in some example, each of the middleware APIs can be referred to as "technology APIs".

Each of the K number of adapters 58 can be programmed to implement dynamic loading of COTS or vendor specific libraries. For example, in some situations, each of the K number of adapters 58 can be calling engines/modules that can make specific API or other calls to the R number of services 60.

The vendor/standard specific APIs of each of the R number of services 60 can include vendor specific enhancements that may not conform to any particular programming paradigm. Each of the N number of middleware APIs 56 and the K number of adapters 58 are configured such that vendor/protocol specific features are excluded/omitted from the middleware API 56. That is, features of each of the R services 60 that cannot be generalized/abstracted for across all of the R number of services 60 are "locked out" or otherwise not included in the set of resources provided by the middleware API 56.

It is noted that in the example illustrated in FIG. 1, for purposes of simplification of explanation, only the first middleware API 56 (middleware API 1) is shown as being connected to a set of K number of adapters 58. However, each of the 2-N middleware APIs 56 is connected to another set of K number of adapters 58 that are in-turn each connected with a corresponding R number of instances of the service 60).

In this disclosure, examples (including a first, second and third example) are described. In these examples, specific applications (e.g., implementations) of the MAL 52 are described. However, it is to be understood that unless otherwise stated, each example can be combined with any other example. That is, unless explicitly noted, each of the described examples is presumed to be combinable.

In a first example (hereinafter "the first example"), each of the first three of the N number of middleware APIs 56 (middleware API 1-3) can implement a transport messaging paradigm. For instance, in the first example, the first middleware API 56 (middleware API 1) can be an API for the Transmission Control Protocol (TCP). Additionally, in the first example, a second middleware API 56 (middleware API 2) can implement the User Datagram Protocol (UDP). Further, in the first example, a third middleware API 56 can implement the Java Messaging Service (JMS).

In the first example, a first set of the K number of adapters 58 and corresponding instances of services 60 can communicate with different vendor specific instances of TCP, including a native operation system (OS) TCP and a Java Virtual Machine (JVM) TCP. Similarly, in the first example, a second set of the K number of adapters 58 can communicate with different vendor specific instances of UDP, such as a native OS UDP and a JVM UDP.

Additionally, in the first example, a third set of the K number of adapters 58 can communicate with different vendor specific instances of JMS, including TIBCO® Enterprise Management Service (EMS), Active MQ, Open MQ, JBoss Application Server (AS), ORACLE® Weblogic, GlassFish AS, etc. Further still, in the first example, each of the three sets of K number of adapters 58 and corresponding sets of R number of instances of services 60 can implement other specific transport messaging paradigms and/or the same transport paradigms (TCP, UDP or JMS) from different vendors, since each vendor may have multiple versions of the same transport messaging paradigm. For instance, one of the instances of the services 60 could be an instance of Active MQ 5.8 and another instance the service 60 could be an instance of Active MQ 5.9.

In a second example (hereinafter, "the second example"), another one of the N number of middleware APIs 56 (namely, a fourth middleware API 56) can implement an integrated data computing mechanism paradigm, such as a Data Grid. As used herein, a "Data Grid" refers to an architecture or set of services that gives individuals or groups of users (via end-user applications) the ability to access, modify and transfer extremely large amounts of logically and/or geographically distributed data for nearly any purpose. Data grids allow this transfer of data via middleware applications and services that pull together data and resources from multiple administrative domains and then present the data to applications upon request. A Data Grid can provide a shared-memory architecture that can "pool" memory of multiple computing devices together to provide a shared view of the memory the pooled memory. The data in a Data Grid can be located at a single site or multiple sites where each site includes an administrative domain governed by a set of security restrictions as to which users and/or software application may access the data. Additionally, multiple replicas of the data may be distributed throughout the Data Grid outside their original administrative domain and the security restrictions placed on the original data for who/what may access the original data is equally applied to the replicas. Specifically developed Data Grid middleware can handle the integration between applications consuming requests by controlling access while making the data available efficiently.

In the second example, each adapter 58 of a set of K number of adapters 58 can communicate with corresponding R number of services 60 that are each associated with different vendor specific or open source Data Grids. Such Data Grids can include, TIBCO® Active Spaces, JBoss Infinispan, Hazelcast, GEMSTONE™ Gemfire, ORACLE® Coherence, GIGASPACES XAP®, etc.

In the second example, the fourth middleware API 56 can be employable (e.g., by a programmer) to implement a Data Grid using a specific vendor's implementation. That is, fourth middleware API 56 can support different vendors and/or different versions of a Data Grid.

In a third example (hereinafter "the third example"), each of the N number of middleware APIs 56 can implement an integrated state-based data centric paradigm, such as a Data Distribution Service (DDS).

As used herein, a DDS refers to an Object Management Group (OMG) machine-to-machine middleware "m2m" standard that enables scalable, near real-time, dependable, high-performance and interoperable data exchanges between publishers and subscribers of data. More particularly, DDS is networking middleware that simplifies complex network programming. DDS implements a publish/subscribe model for sending and receiving data, events, and commands among nodes. In a DDS, the nodes that produce information (publishers) create "topics" (e.g., temperature, location, pressure) and publish "samples". The DDS can deliver the samples to subscribers that declare an interest in that topic. DDS addresses the needs of applications such as air-traffic control, smart grid management, and financial trading and other "big data" applications. DDS is used in applications ranging from smartphone operating systems, transportation systems and vehicles, software-defined radio, healthcare systems, etc. DDS can also be used in certain implementations of the "Internet of Things".

In the third example, each of the K number of adapters 58 and the corresponding R number of services 60 can implement instances of DDS including RTI CONNEXT® DDS, PRISM TECH® DDS and CoreDX. For instance, in the third example, the fifth middleware API 56 can be employed (e.g., by a programmer) to implement a DDS using a specific vendor's implementation. That is, the fifth middleware APIs 56 can support different vendors and/or different versions of a DDS.

The MAL 52 can include a master API 70. The master API 70 can include resources (e.g., API calls), such has functions, routines, protocols and/or tools for building software applications with any of the N number of middleware APIs 56. That is, each of the resources provided by the master API 70 is compatible with any of the N number of middleware APIs 56. Accordingly, the resources of the master API 70 are generic (e.g., generalized) with respect to each of the N number of middleware APIs 56. For instance, in a combination of the first, second and third examples, the MAL API can include a resource for a publishing data and subscribing to data.

The MAL 52 can also include a control engine 72 configured to select which of the N number of middleware APIs 56 for executing a resource requested (e.g., via an API call) from the master API 70 by an application, such as the mission specific application 54. Additionally, the control engine 72 can load (e.g., instantiate) a particular instance of an adapter 58 at runtime to send specific commands (API calls) to one or more of the R number of services 60. In some examples, the control engine 72 can be configured (e.g., with a configuration file) such that instantiation of resources are "funneled" to a particular (e.g., single) middleware API 56. That is, in some examples, the control engine 72 can be configured such that resource calls to the master API 70 are implemented by a predetermined middleware API 56.

Further, in other examples, the control engine 72 can be configured to select (e.g., arbitrate) a particular middleware API 56 amongst the N number of middleware APIs 56 to implement a particular resource provided by the master API 70. In some examples, the selected middleware API 56 may have the lowest resource execution cost to instantiate a particular resource. Additionally or alternatively, the control engine 72 can facilitates load-balancing techniques of the different sets of R instances of services 60 to distribute instantiation/execution of a plurality of resources among a plurality of the N number of middleware APIs 56. For instance, in some examples, the control engine 72 can be configured with a set of parameters for a policy file that can be employed during instantiation of the selected adapter 58, and the parameters can specify how load balancing can be achieved by the R instances of services 60.

Upon instantiation of the selected adapter 58, the master API 104 can forward the resource request to the middleware API 56 associated with the selected adapter 58, which can be referred to as the selected middleware API. The selected middleware API 56 can forward the resource request to the selected adapter 58. The selected adapter 58 can convert resource requests into a command (e.g., an API call or a series of API calls) compliant with the particular programming paradigm employed by the selected middleware API 56. Additionally, the selected adapter 58 can send the command to an instance of the service 60. The service 60 can execute the command and provide a response to the command to selected adapter 58. The selected adapter 58 can convert the response back into a format employed by the selected middleware API 56 (e.g., an API response), which can be referred to as a response to the resource request. The selected middleware API 56 can forward the response to the resource request to the master API 70. The master API 70 can send the requesting application (e.g., the mission specific application 54) the response to the resource request. Additionally or alternatively, it is noted that in some examples, the "converting" of the resource request into a command can be performed at the selected middleware API 56.

Thus, a computer programmer can employ the resources to generate the mission specific application 54. The mission specific application 54 can execute on nearly any operating system (e.g., OS X®, MICROSOFT WINDOWS®, LINUX, VxWorks etc.). That is, the master API 70 is agnostic to the operating system or architecture employed by the mission specific application 54.

For instance, in the first example, where the first to third middleware APIs 56 are directed to transport messaging paradigms, the master API 70 can include a resource for "publishing data" that includes a location of the data (e.g., a source) and a destination address for the data. Any of the N number of middleware APIs 56 can include one or more functions that can transport the data to the destination. Thus, upon the master API 70 receiving a "publish data" request (e.g., a resource request) from the mission specific application 54, the publish data request can be forwarded to a selected adapter 58 for a middleware API 56 that is selected to execute the transport of the data based on the configuration file.

Continuing with the first example, it is presumed that the selected middleware API 56 is a JMS API (e.g., the third middleware API 56, in the first example). Thus, the API call from the mission specific application 54 can be a request for a point-to-point transfer of a message to a specific destination. In response, the selected adapter 58 can generate a command (e.g., an API call) for a Java platform (the service 60) to actuate a Java message based on the API call on a corresponding adapter 58 of a Java platform (the service 60). The Java platform (the service 60) can send a confirmation (or failure) message to the selected adapter 58 as a response to the command from the selected adapter 58. The selected adapter 58 (or the middleware API 56) can convert the response to the command into a standard for the publish data request. Moreover, the master API 70 can provide a response to the "publish data" request to the mission specific application 54 based on the response to the API call from the selected middleware API 56 via the adapter 58.

By implementing the system 50 with the MAL 52, the portability of the code for the mission specific application 54 can be substantially increased. For example, some vendors provide particular instances of services 60 that are not fully compliant with standards of a particular programming paradigm. Additionally or alternatively, some vendors may provide a service 60 that includes a superset of features supported by the particular programming paradigm. In either of these instances, the MAL 52 can prevent reliance on a non-standard feature of a vendor specific software application.

Additionally, in some examples, the mission specific application 54 can make direct API calls to each of the N number of middleware APIs 56 (or some subset thereof). In these situations, paradigm specific (but not vendor specific) features can be utilized by the mission specific application 54.

Additionally or alternatively, one or more of the N number of services 60 executed by a particular middleware API 56 may have limited scalability. In such a situation, an additional instance of the same system (and in some instances, another adapter 58) may be added for load balancing if limits of the scalability are reached. Alternatively, software and/or a system from another vendor (and another adapter 58) with additional scalability can be added to the system 50 and can be separately instantiated by a particular instance of the middleware APIs 56. In this manner, changes to the set of K number of adapter 58 and/or the R number of instances of the services 60 would require little to no changes to the mission specific application 54, thereby increasing the portability of the underlying source code for the mission specific application 54.

Further still, in some instances, the MAL 52 can provide features that would be otherwise unavailable to a single middleware API 56. For instance, in the second example, where the fourth middleware API 56 represents a Data Grid one (or more) of the R number of services 60 may be configured to handle a single data request at a time (e.g., serial processing). By implementing the MAL 52 and a control engine 72 that facilitates load-balancing techniques implemented by the various sets of R number of instances of services 60, parallel processing can be implemented by distributing data queries across a plurality of sets of the R number of services 60, including multiple instances of the same service 60 that may be controlled (in some examples) by a single adapter 58.

Figure 2:
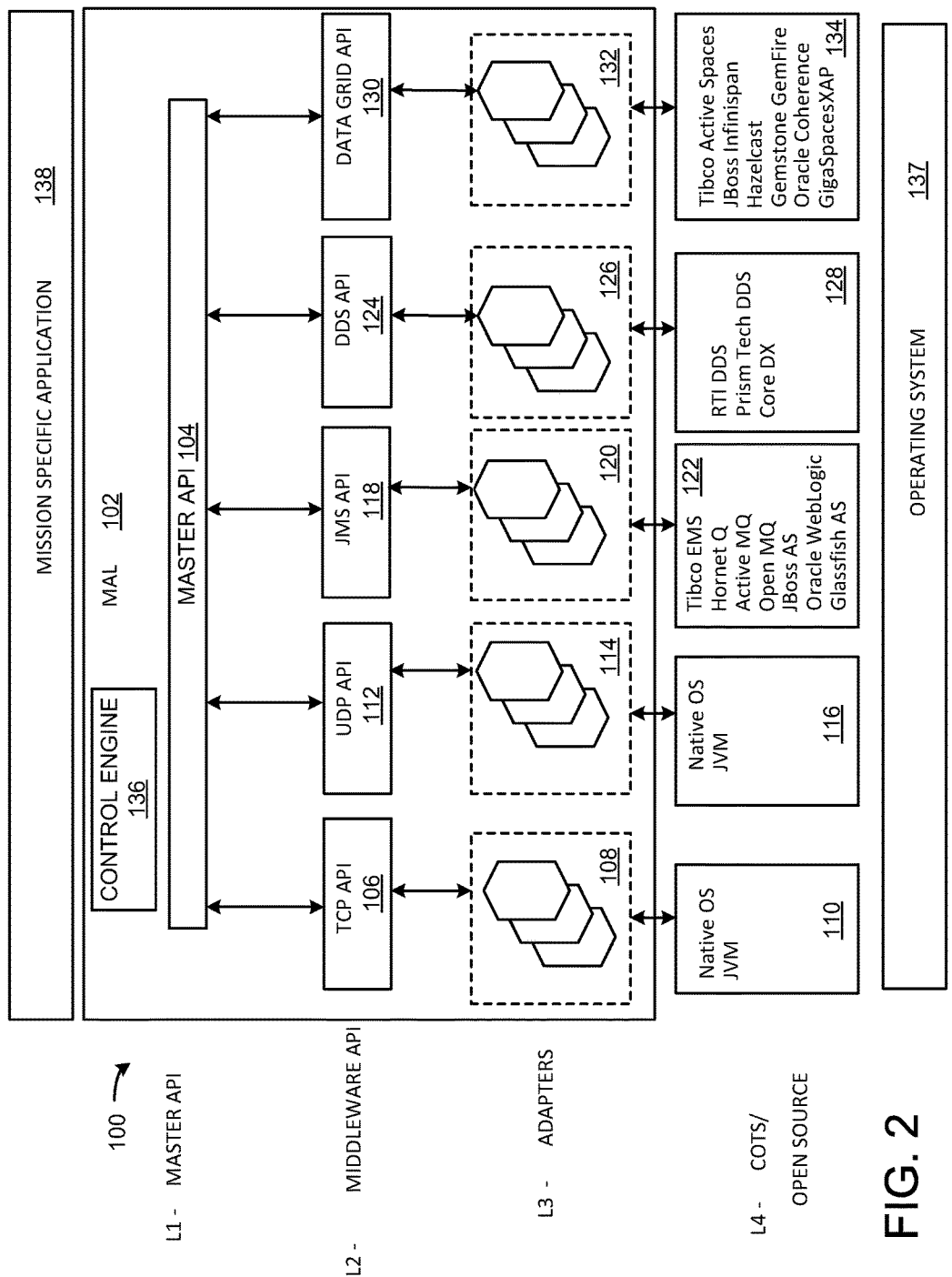
FIG. 2 illustrates an example of a multi-layer system executing a MAL.

FIG. 2 illustrates an example of a multi-layer system 100 for implementing a MAL 102. The system 100 can be, for example a specific implementation of the system 50. A first layer (labeled in FIG. 2 as "L1—MASTER API") can include the MAL. The MAL 102 can be implemented as the MAL 52 illustrated in FIG. 1.

The MAL 102 can include a master API 104 that can be implemented in a manner similar to the master API 70 of FIG. 1. A second level (labeled in FIG. 2 as "L2—MIDDLEWARE API") includes five instances of middleware APIs of the MAL 102. The middleware APIs can alternatively be referred to as technology APIs and can be employed to implement the N number of middleware APIs 56 of FIG. 1.

The second level can include a TCP API 106 that communicates with a set of TCP adapters 108 on a third level of the system 100 (labeled in FIG. 2 as "L3—ADAPTERS"). The set of TCP adapters 108 can be implemented, for example as a set of the K number of adapters 58 illustrated in FIG. 1. The TCP adapters 108 can each interface with a fourth level of the system 100 (labeled in FIG. 2 as "L4 COTS/OPEN SOURCE") that include specific instances of a service (e.g., the set of R instances of service 60), which can be referred to as TCP service 110. In the present example, the TCP service 110 can include a native OS TCP platform and a JVM TCP platform. The components of the fourth level of the system 100 (including the TCP service 110) are inclusive of both a vendor and/or standard specific interface (e.g., an API) and an underlying operational platform. It is noted that in some instances, these components may be operating on separate computing devices.

The second level can also include a UDP API 112 that communicates with a set of UDP adapters 114 on the third level of the system 100. The set of UDP adapters 114 can be implemented, for example as a set of the R number of adapters 58 illustrated in FIG. 1. The UDP adapters 114 can each interface with the fourth level of the system 100 that include specific instances of a service (e.g., a set of R instances of service 60), which can be referred to as a UDP service 110. In the present example, the UDP service 110 can include a native OS UDP platform and a JVM UDP platform.

The second level can further include a JMS API 118 that communicates with a set of JMS adapters 120 that can be implemented, for example as a set of the K number of adapters 58 of FIG. 1. The JMS adapters 120 can each interface with the fourth level of the system 100 that include specific instances of services (e.g., a set of R instances of service 60), which can be referred to as a JMS service 122. In the present example, the JMS service 122 can include a TIBCO® EMS platform, a HornetQ platform, an Active MQ platform, an Open MQ platform, a JBoss AS platform, an ORACLE® Weblogic platform and a Glassfish AS platform.

Figure 3A:
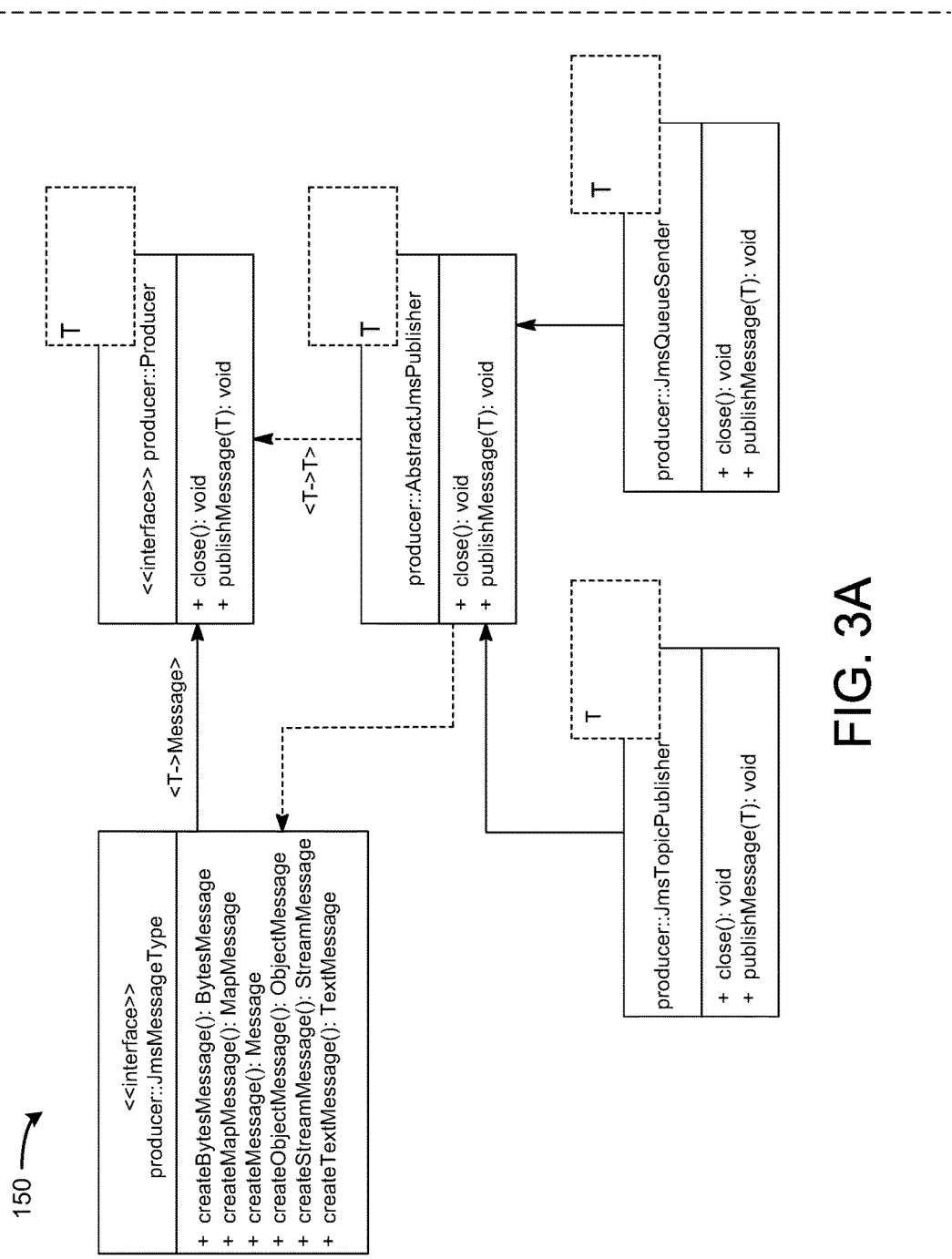
FIGS. 3A-3B illustrates an example of a Unified Modeling Language (UML) diagram characterizing a registry of a Java Messaging System (JMS) Application Programming Interface (API).
Figure 3B:
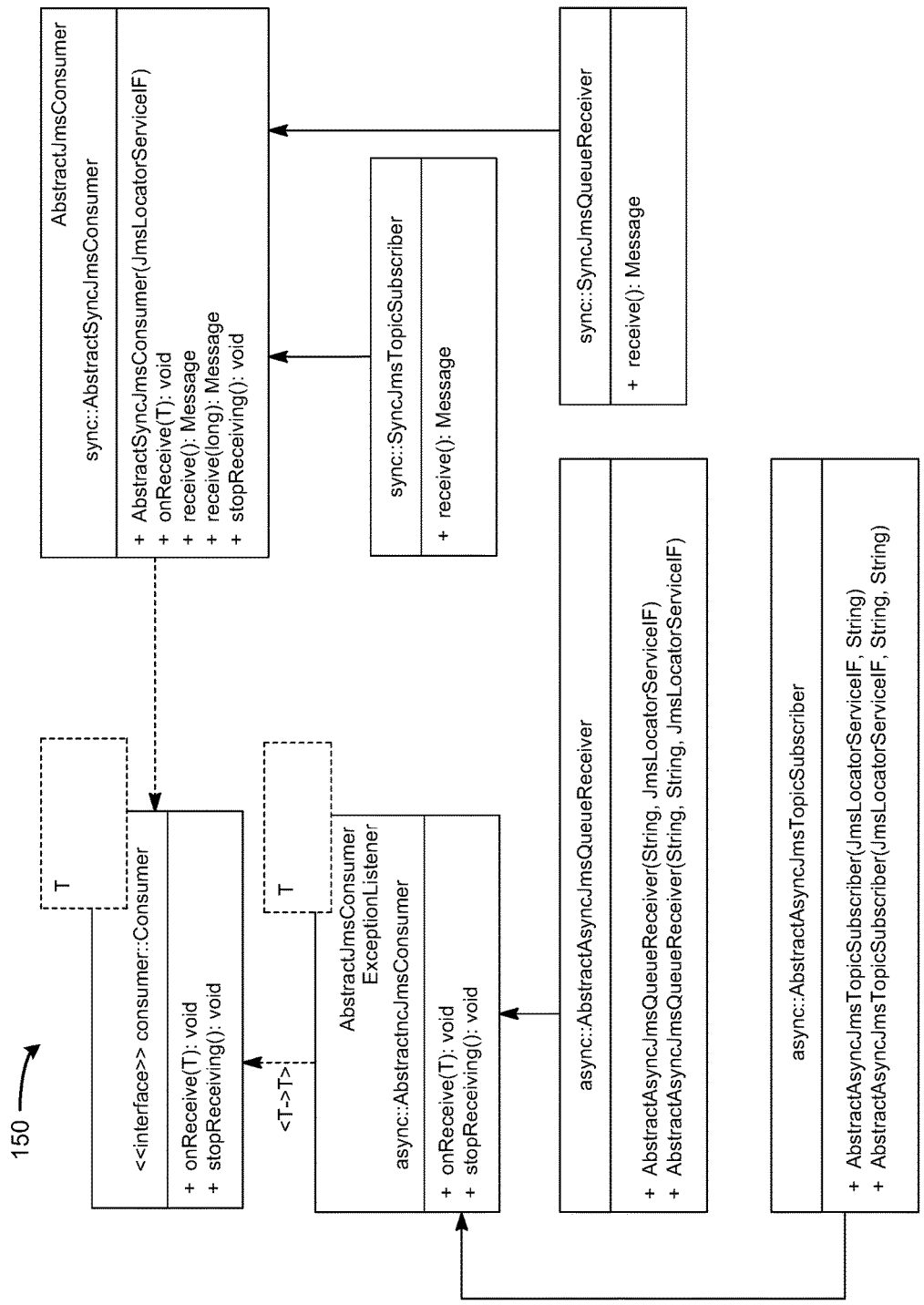
Figure 4A:
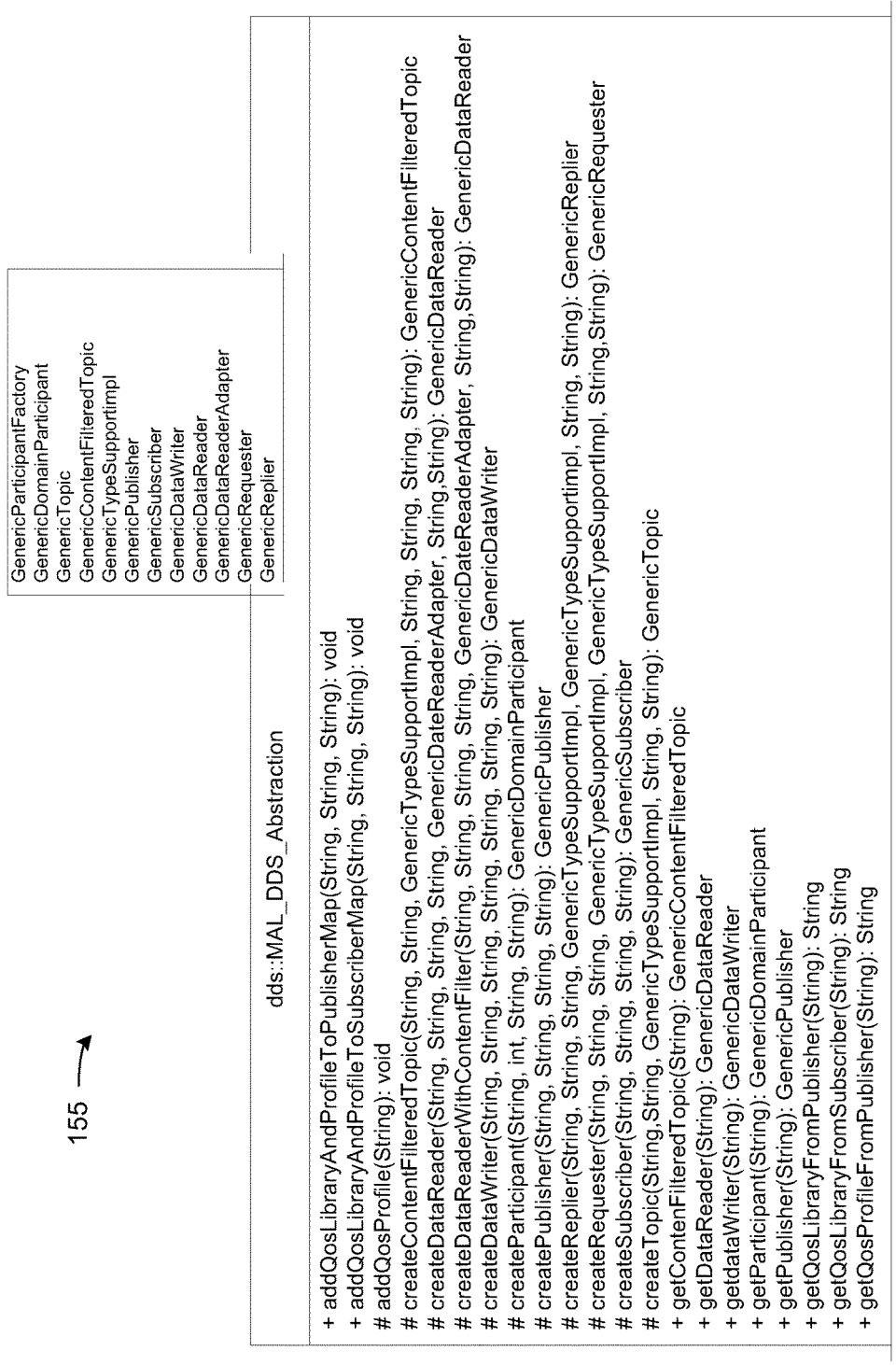
Figure 4C:
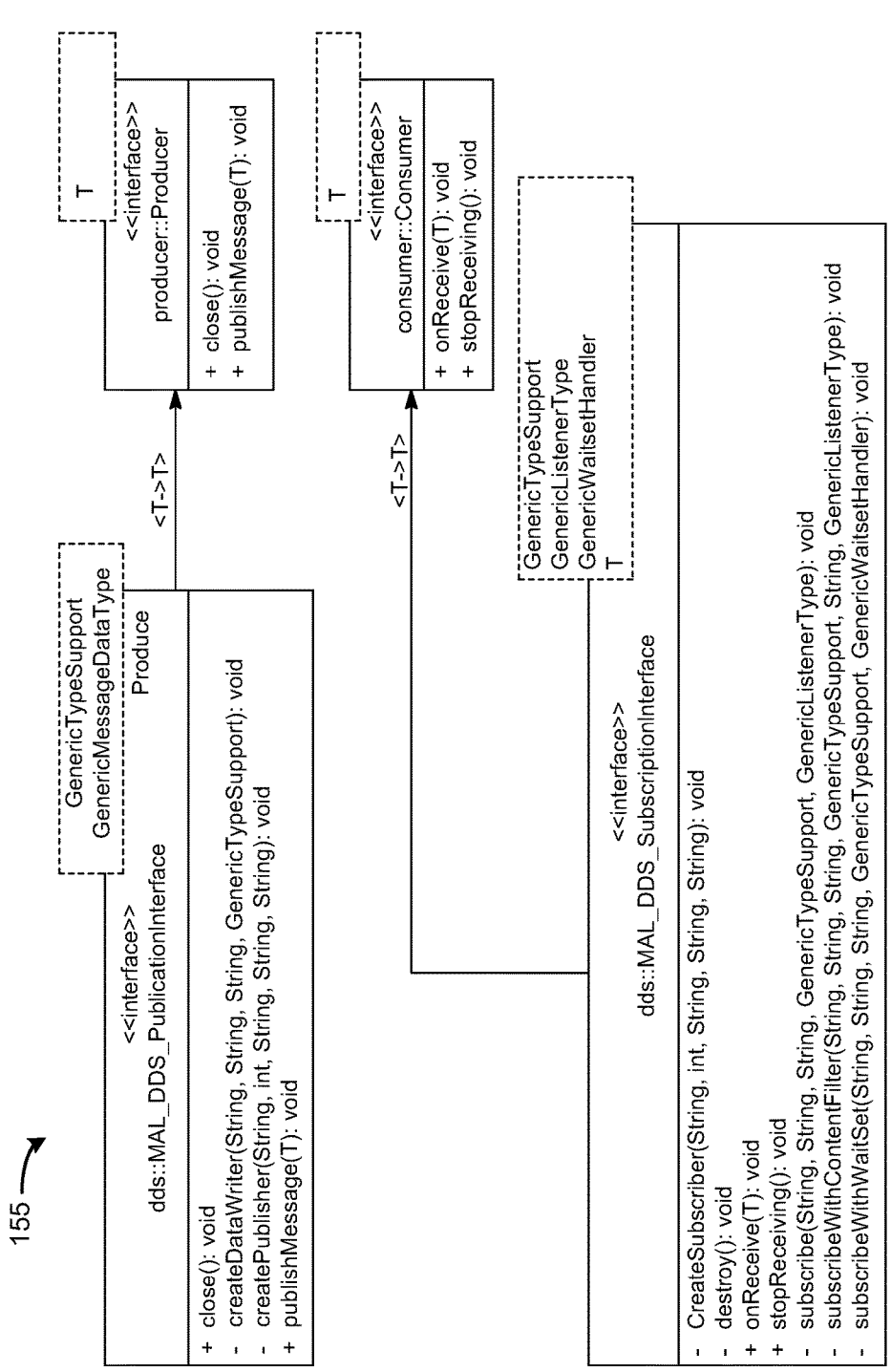
Figure 4D:
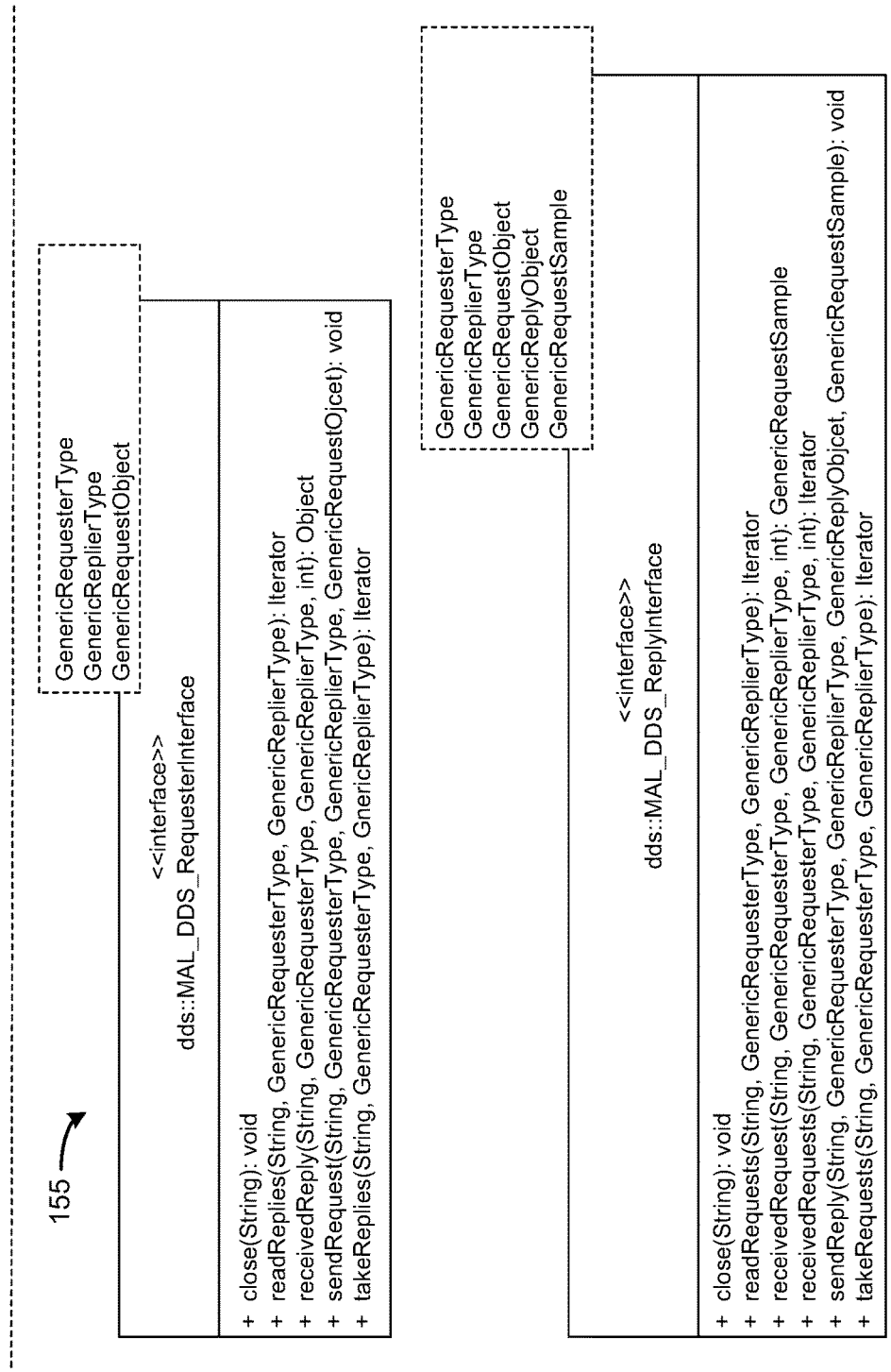

FIGS. 3A-3B illustrates an example of a Unified Modeling Language (UML) diagram 150 characterizing a portion of a look-up table (or other data structure) stored in the control engine 136 for the JMS API 118. The UML diagram 150 characterizes high level interfaces and objects employed to send and receive data across the JMS technology. JMS is an API standard (paradigm) and provides many capabilities. Consequently, the JMS API 118 supports all such capabilities defined by the standard including the ability to send and receive data across JMS topics (one to many) and JMS queues (one to one). Furthermore, the JMS API 118 supports multiple modes of data receipt including asynchronous and synchronous messaging.

Referring back to FIG. 2, the second level can still further include a DDS API 124 that communicates with a set of DDS adapters 126 that can be implemented, for example as a set of the K number of adapters 58 of FIG. 1. The DDS adapters 124 can each interface with the fourth level of the system 100 that include specific instances of services (e.g., a set of R instances of services 60), which can be referred to as a DDS 128. In the present example, the DDSs 128 can include a RTI CONNEXT® DDS platform, a Prism Tech DDS platform and a CoreDX platform.

FIGS. 4A-4D illustrates an example of a UML diagram 155 characterizing a portion of a look-up table (or other data structure) stored in the control engine 136 for the DDS API 124. The UML diagram 155 characterizes high level interfaces and objects used to send and receive data across the DDS technology. DDS is both an API and a wire protocol (standard) and provides many capabilities. Consequently, the DDS API 124 embraces all capabilities that are common to the DDS paradigm, including the ability to send and receive data across DDS topics. Furthermore, referring back to FIG. 2, the DDS API 124 facilitates data transmission across different vendor implementations without the need to bridge. For instance, since DDS is a wire standard, the DDS API 124 can be configured to (e.g., in response to API calls) to send data to an RTI DDS topic and to receive the data using a Prism Tech platform without the employment of any compatibility adapters.

Additionally or alternatively, the DDS API 124 supports the concept of quality of service (QOS) policies, which QOS policies enables fine grained modifications to data delivery mechanisms. The DDS API 124 also supports redundancy measures such as "active-active" or "active-passive" publications. Through the use of the DDS API 124, the users (direct users or clients) of the application leveraging the DDS API 124 are veiled from the implementation details of each different vendor of the DDSs 128. The technologies become swappable, and therefore, much more cost effective.

Furthermore, the DDS 128 can monitor the network stress publishers and subscribers exhibits on a current ecosystem and dynamically and each DDS 128 can readjust QOS policies and redundancy measures to create the least amount of network impact while still guaranteeing an acceptable degree of throughput, the threshold of which is customizable. This degree of dynamic network-tuning can be mission critical in the Unmanned Ariel System (UAS) space since reliable, deterministic and expedient delivery often determines success or failures of missions. By introducing the self load-balancing mechanism that the DDS 128 provides ensures that DDSs 128 will be an integral part of next-generation mission systems.

Referring back to FIG. 2, the second level can yet still further include a Data Grid API 130 that communicates with a set of Data Grid adapters 132 that can be implemented, for example as a set of the K number of adapters 58 of FIG. 1. The Data Grid adapters 132 can each interface with the fourth level of the system 100 that include specific instances of services (e.g., a set of R instances of the service 60), which can be referred to as Data Grid service 134. In the present example, the Data Grid service 134 can include TIBCO® Active Spaces, JBoss Infinispan, Hazelcast, GEMSTONE™ Gemfire, ORACLE® Coherence and GIGASPACE XAP®.

Figure 5A:
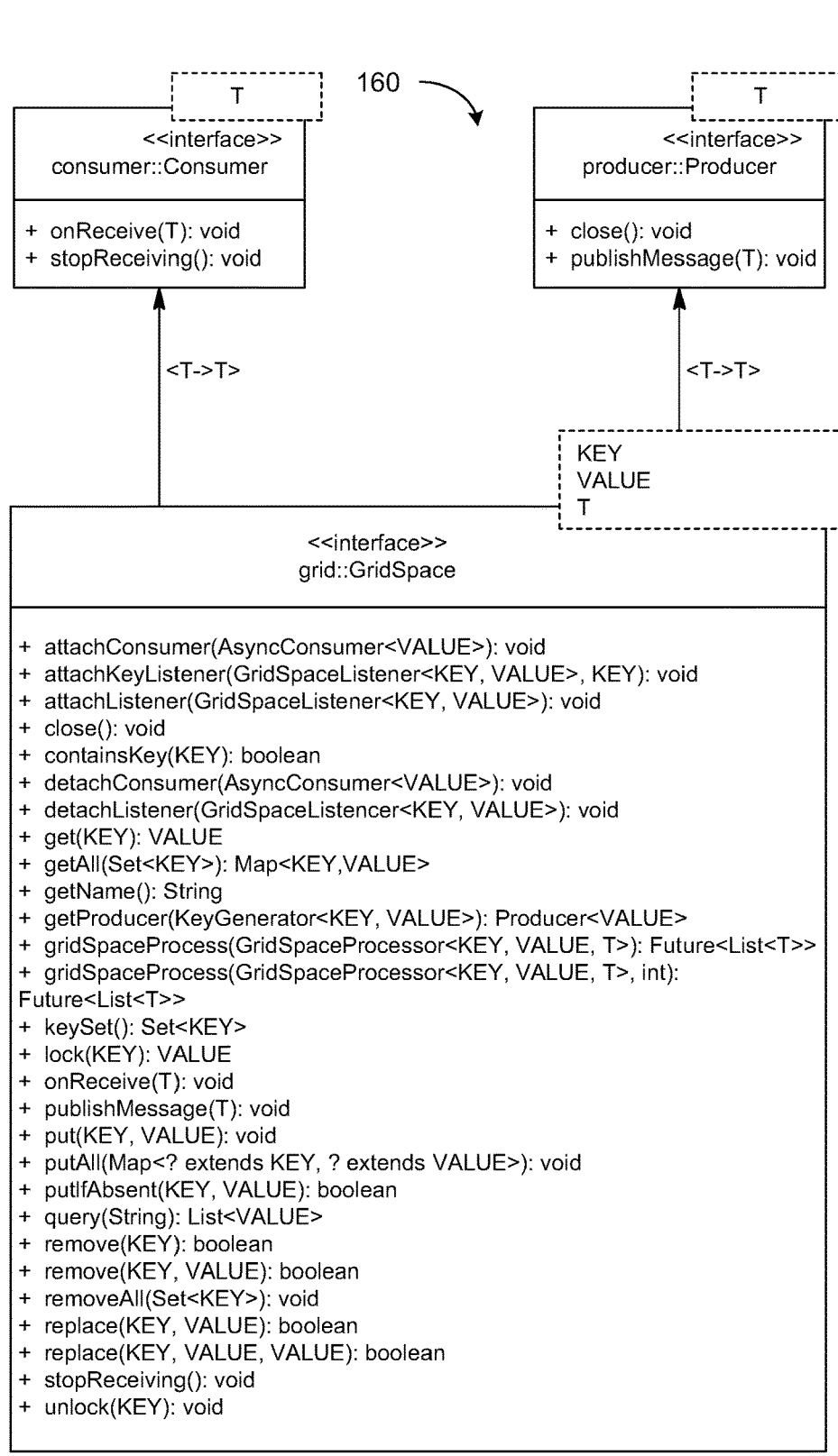
FIGS. 5A-5B illustrates an example of a UML diagram characterizing a registry of a Data Grid API.
Figure 5B:
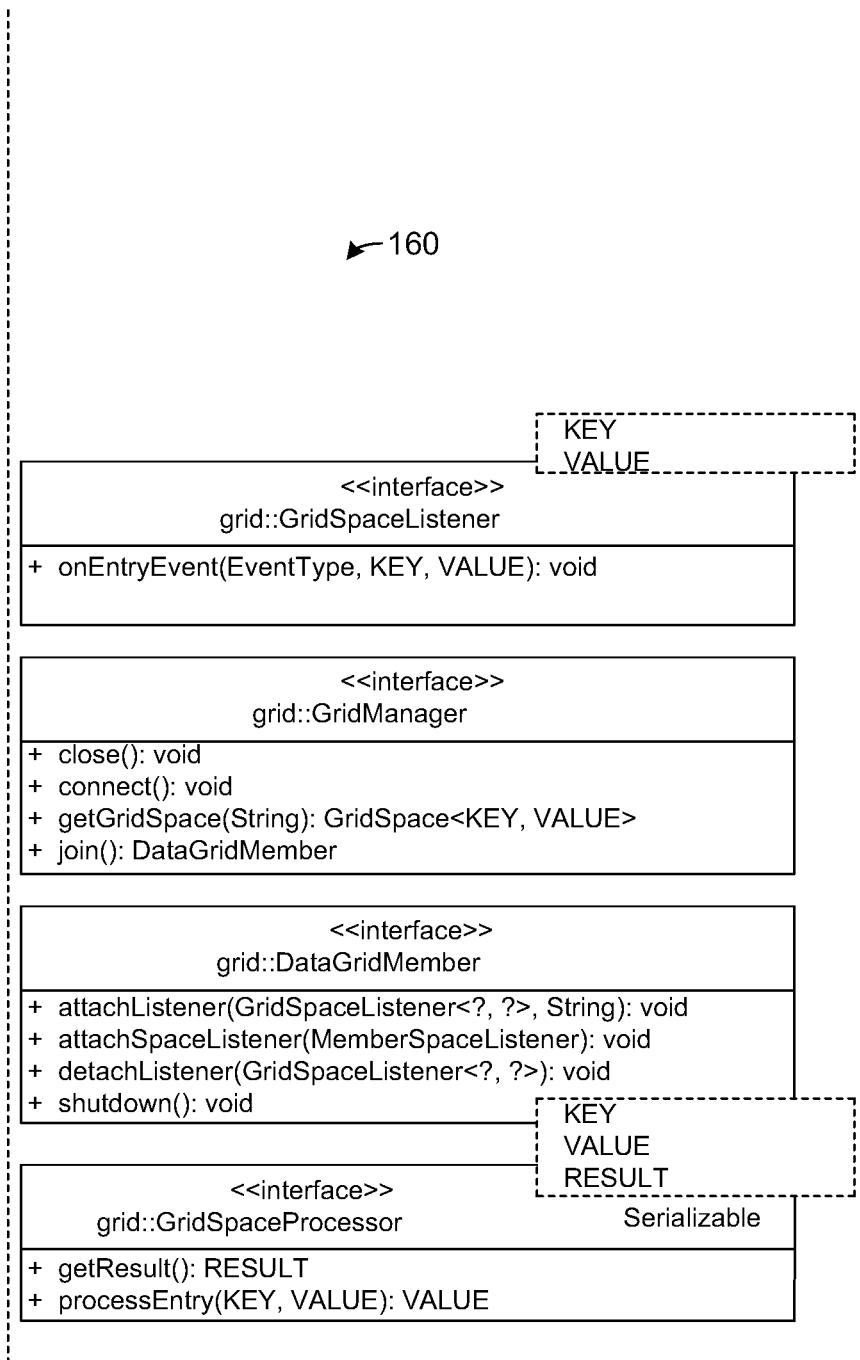

FIGS. 5A-5B illustrates an example of a UML diagram 165 characterizing a portion of a look-up table (or other data structure) stored in the control engine 136 for the Data Grid API 130. Data Grids are an emerging/evolving technology and there is no explicit standard paradigm. The Data Grid API 130 is designed to persist or remove data from memory, send and receive data supporting one-to-one or one-to-many forms of messaging, and conduct remote distributed processing. Data in a Data Grid is stored with an associated unique key, known as key/value mapping. The Data Grid API 130 provides full mapping operations (e.g. get, put, remove as a method to send and receive and/or store data) as well as support for atomic compare and swap (CAS) operations (e.g. replace (key, old value, new value)). As illustrated in the ULM diagram 165, the Data Grid API 130 supports standardized distributed processing via a GridSpace::gridSpaceProcess methods in conjunction with a GridSpaceProcessor interface. Implementing distributed processing GridSpace::gridSpaceProcess methods in conjunction with a GridSpaceProcessor provides support for efficient use of a Map/Reduce pattern. As illustrated in the UML diagram 165, the Data Grid API 130 provides a standard way to manage the any Data Grid via a GridManager interface. Moreover, as illustrated in the UML diagram 165, the Data Grid API 130 provides control to post-process changes to distributed data as events via a DataGridMember Interface.

FIGS. 9-14 include examples of lists of API calls and corresponding adapter commands needed to instantiate API calls with the Data Grid API 130. In particular, FIG. 9 illustrates an example of the list of API calls provided by the Data Grid API 130. It is noted that the UML diagram 160 illustrated in FIGS. 5A-5B illustrate another view of the API calls provided by the Data Grid API 130. FIG. 10 illustrates an example of the list of the API calls provided by the Data Grid API 130 mapped (cross-referenced) to methods employed on the TIBCO® Active Spaces Data Grid. FIG. 11 illustrates an example of the list of the API calls provided by the Data Grid API 130 mapped (cross-referenced) to methods employed on the ORACLE® coherence Data Grid. FIG. 12 illustrates an example of the list of the API calls provided by the Data Grid API 130 mapped (cross-referenced) to methods employed on the GEMSTONE™ Gemfire Data Grid. FIG. 13 illustrates an example of the list of the API calls provided by the Data Grid API 130 mapped (cross-referenced) to methods employed on the Hazelcast Data Grid. FIG. 14 illustrates an example of the list of the API calls provided by the Data Grid API 130 mapped (cross-referenced) to methods employed on the JBoss Infinispan Data Grid.

Referring back to FIG. 2, The TCP adapters 108, the UDP adapters 114, the JMS adapters 120, the DDS adapters 126 and the Data Grid adapters 132 can interface (via adapters on the third level) with the various forms of services (on the fourth level) to cause particular commands to be executed therein. In one example, the MAL 102 can include a control engine 136 that employs a runtime descriptor coupled with dynamic resource loading to allocate, manage and make available resources to requesting clients. This mechanism abstracts away implementation specific requirements and dependencies from developers during software development. Furthermore, there are no dependencies to any vendor product libraries within the user application software baseline (e.g., the mission specific application 54 depicted in FIG. 1). The details of the runtime requirements are handled during deployment where a descriptor contains the particular driver to load; and, the required driver is specified via runtime configuration through specifying the appropriate location of the runtime library to load. Drivers are dynamically loaded upon resource request triggered by the software client. An internal resource map registry can be maintained that is network accessible and can be queried. The internal map registry can be employed to provide appropriate connection information or resources to send and receive data across the various technology paradigms.

Figure 6:
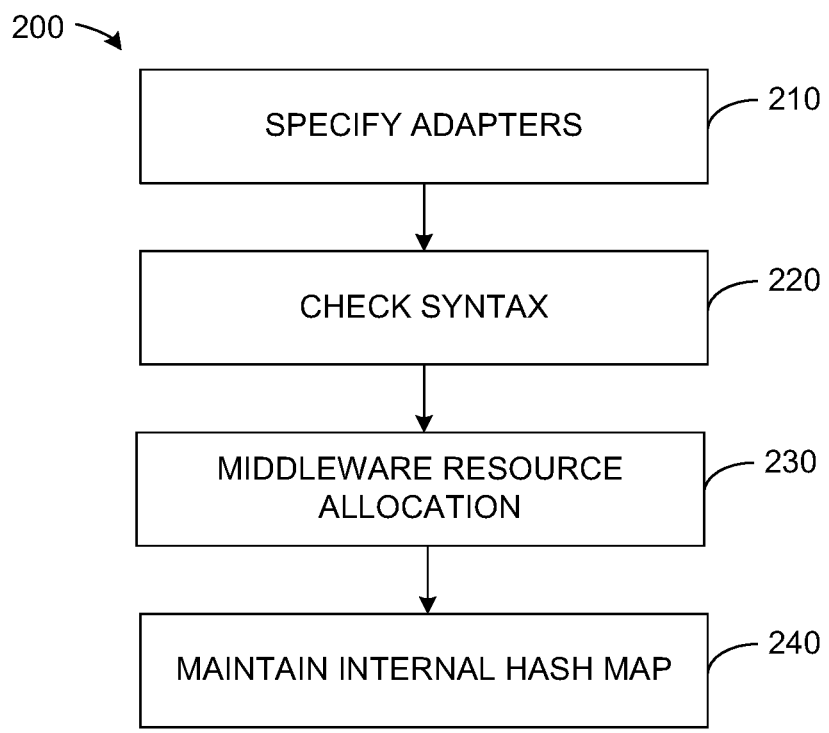
FIG. 6 illustrates an example of a flowchart depicting a method of an adapter process flow.

Each of the TCP adapters 108, the UDP adapters 114, the JMS adapters 120, the DDS adapters 126 can implement an adapter process 200, as illustrated in FIG. 6. At 210, an adapter is specified by a control engine via a template for middleware configuration that has been developed, the template include a specification for any middleware type and configuration information. At 220 a dynamic resource adapter processor (of the control engine) conducts syntax and semantic checking of configuration for middleware. The dynamic resource adapter processor checks for accessibility of a resource. A failure provides a notification for an application (and/or user), causing the process 200 to terminate. At 230, the adapter can allocate and instantiate middleware resources for each middleware instance. The adapter can perform checks to ensure Internet Protocol (IP), ports are accessible. Failure of the checks can result in a notification to application (or user), and is configurable so that the process 200 can continue to advance. At 240, the adapter can maintain an internal hash table that includes a middleware type, <IP, Port». The hash table can be discoverable and queried. From a particular instance type, IP and Port, Connection information can be gathered to either send or receive data.

Figure 7:
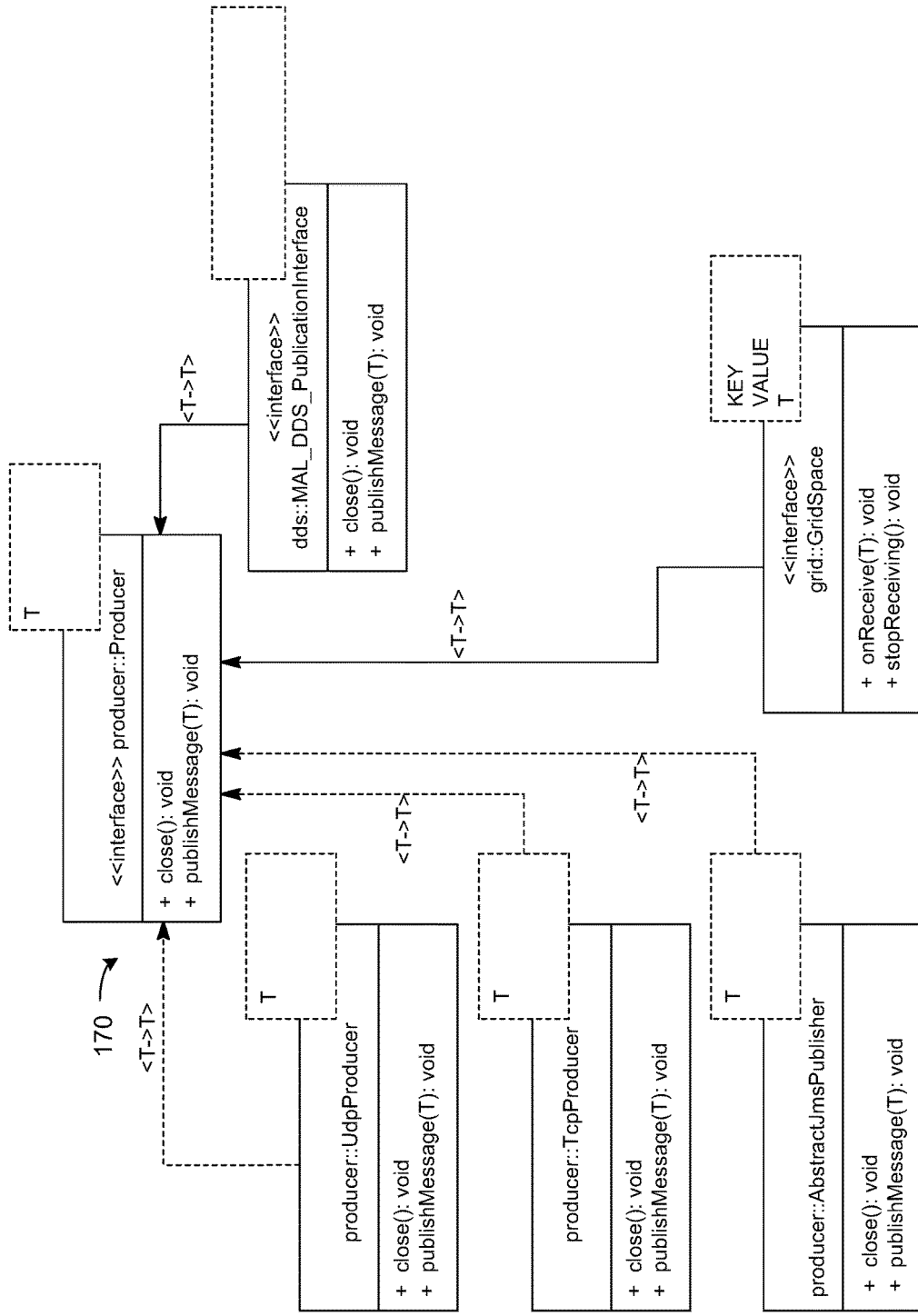
FIG. 7 illustrates an example of a UML diagram characterizing a registry of a master API.
Figure 8:
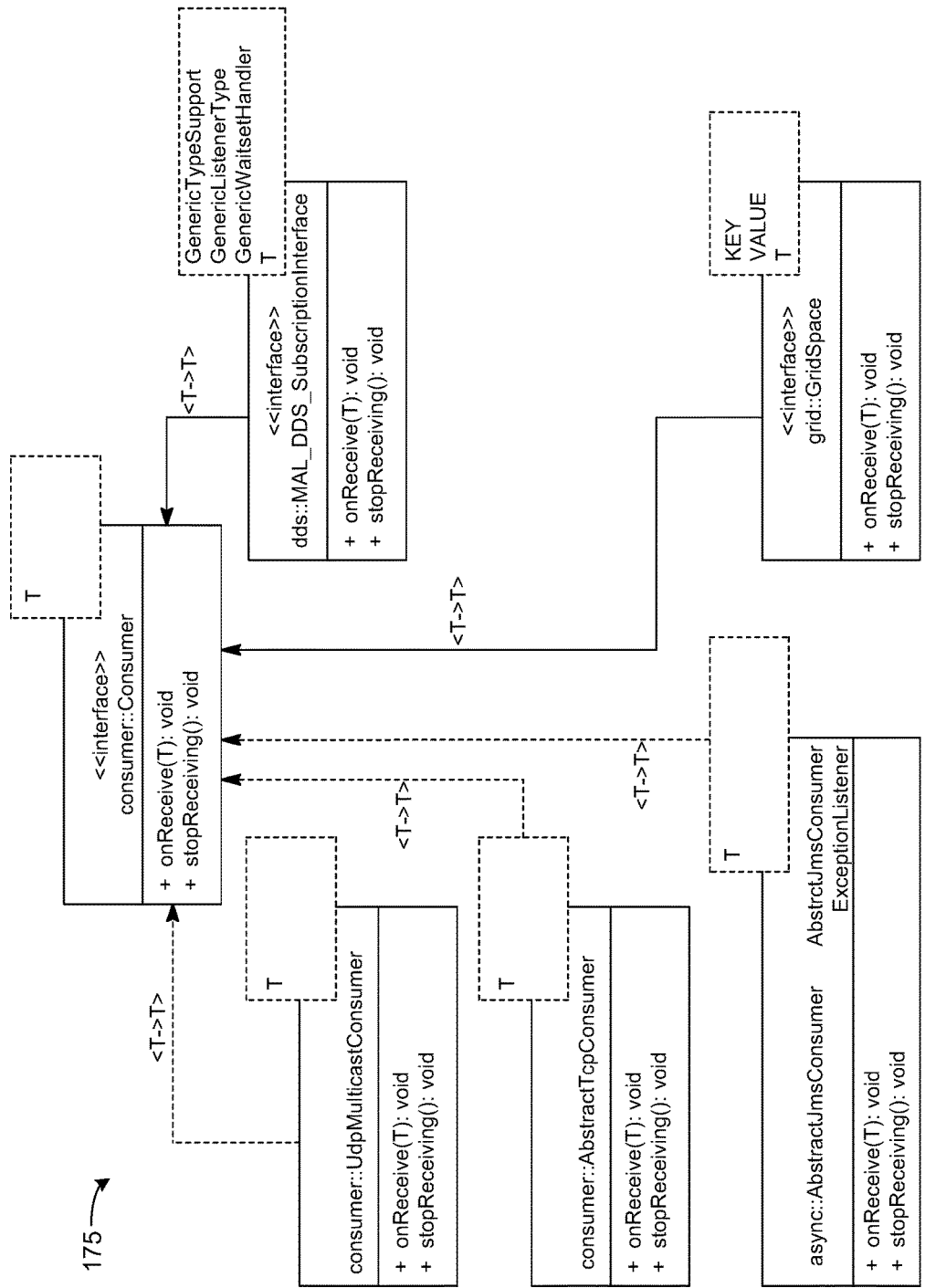
FIG. 8 illustrates another example of a UML diagram characterizing a registry of a master API.

Referring back to FIG. 2, the master API 104 (of the first level) can include generalized resources (e.g., API calls) that are common throughout the TCP API 106, the UDP API 112, the JMS API 118, the DDS API 124 and the Data Grid API 130. FIGS. 7 and 8 illustrate UML diagrams 170 and 175 that characterize "publish data" and "subscribe data" features of the master API 104, respectively that can be stored in a look-up table (or other data structure) in the control engine 136. As illustrated in the UML diagram 170, to send data, each middleware API (TCP API 106, the UDP API 112, the JMS API 118, the DDS API 124) implements a producer interface. Additionally, as illustrated in the UML diagram 175, to receive data, each middleware API (TCP API 106, the UDP API 112, the JMS API 118, the DDS API 124) implements a consumer interface.

It is noted that in some examples, fewer (or more) middleware APIs may be implemented. For example, it is considered that in some situations, either the DDS API 124 and/or the Data Grid API 130 can be omitted. In such a situation, the master API 104 can be modified accordingly.

Each level of the multi-level system (levels 1-4) can run on an operating system (OS) 137, such as a OS of a server. In this manner, the MAL 102 can provide an abstraction for software applications that employ resources of the system. For example, a mission specific application 138 that can utilize resources provided by the master API 104 and/or one or more of the middleware APIs (on the second level), namely the TCP API 106, the UDP API 112, the JMS API 118, the DDS API 124. The mission specific application 138 can be operating on a remote computing system, such as an end-user computing device. The mission specific application 138 can be executing, for example on an OS. In one example, the mission specific application 138 can be software executing on a UAV, and in other examples, the mission specific application 138 can be implemented on nearly any industry that requires a publish/subscribe model for data.

During an initial setup and configuration, the MAL 102 can parse a registry and/or look-up tables (e.g., a hash map) that can identify particular resource requests (API calls) with particular middleware APIs. In one example, during the initial setup, the mission specific application 138 can generate a resource request (an API call) for the master API 104. In response, the control engine 136 can consult a configuration file to identify the particular middleware to instantiate the resource request. FIG. 15 illustrates one example of a configuration file 250 that can be employed by the control engine 136 to load the adapters for the various middleware APIs, namely the TCP API 106, the UDP API 112, the JMS API 118, the DDS API 124.

Upon selecting a particular middleware API, the selected middleware API can employ local registry and/or look-up tables (e.g., such as those characterized in FIGS. 9-14) to make adapter calls to specific adapters to instantiate the resource request in a corresponding instance of the service.

In the system 100, the MAL 102 groups, packages and integrates several disparate programming (middleware) paradigms and technologies under a single API, namely the master API 104. Accordingly, the MAL 102 integrates architectures supported by legacy protocols (TCP/UDP) and modern protocols/technologies (JMS, DDS, Data Grids) such as client-server, unicast, and multicast, hub-spoke, peer-to-peer, and shared memory architecture styles.

As noted, the mission specific application 138 can make API calls to either the master API 104 (at the first level of the system 100) and/or to a specific middleware API (at the second level of the system 100). A mission specific application 138 written to make resource requests (API calls) exclusively to the master API (on the first level of the system 100) has the greatest portability. Thus, an example of the mission specific application 138 that employs resource requests (API calls) from the master API 104 and an underlying technology such as the JMS API 118 can seamlessly be ported to using a different technology paradigm such as Data Grids or DDS with no change in the application logic and only minimal changes to the code base to support modified configuration. The master API 104 provides publish/subscribe features for all the included technology stacks and is extensible to future standards such as InfiniBand, for example. Moreover, more specific, less generalized middleware APIs (namely, the TCP API 106, the UDP API 112, the JMS API 118, the DDS API 124 and the Data Grid API 130) are provided when more technology-centric capabilities are needed.

Each of the middleware APIs, namely the TCP API 106, the UDP API 112, the JMS API 118, the DDS API 124 and the Data Grid API 130 (on level 2 of the system 100) provides deeper technology-centric capabilities and permits a programmer to "swap out" a middleware provider type for another middleware provider within the same family ecosystem. For example, the JMS API 118 provides topic and queue messaging, supports both synchronous and asynchronous modes of delivery and supports persistence and non-persistence. Accordingly, if the mission specific application 138 is configured to make resource request (API calls) to the JMS API 118 then an underlying technology such as OpenMQ can be immediately ported to using ActiveMQ with no (or minimal) coding changes. This same concept is also true for the various underlying technologies of the DDS API 124 and the Data Grid API 130.

Through the dynamic resource adapter processor mechanism of the control engine 136, the MAL 102 can support multi-parallel instantiations of T instances of heterogeneous families of technologies simultaneously, where T is an integer greater than or equal to one. For example, the MAL 102 could support two (2) instances of Active MQ (JMS), three (3) instances of TIBCO® EMS (JMS), two (2) instances of Native OS TCP, five (5) instances of JVM UDP, three (3) instances of RTI CONNEXT® DDS, and two (2) instances of Hazelcast (Data Grids), and three (3) instances of TIBCO® ActiveSpaces Data Grids running concurrently.

The MAL 102 provides a unified view and discovery of the allocated resources. For example, JMS employs the Java Naming Directory Interface (JNDI) standard for discovery of resources, DDS has its own standard method for discovery of resources, and Data Grids has no standard for discovery of resources. The MAL 102 provides a unified view and discovery of the disparate resources. Furthermore, the MAL 10 can be configured (e.g., via the configuration file) to push discovery data to the various discovery mechanisms in JNDI, the Lightweight Access Directory Protocol (LDAP) or DDS.

Due to the packaging and integration of these disparate technologies, namely messaging and data protocols, DDS and Data Grids, the MAL 102 provides substantial architectural flexibility through architecture partitioning. For example, many legacy ground control stations for UAV systems are deployed onto a single type of technology, such as Glassfish, for all types of capabilities and functions (e.g., sending vehicle commands, receiving vehicle status, viewing a mission plan, etc.). Often deployment of ground control stations for UAVs (or other types of resources) faces performance, scalability and/or cost challenges due to the inherent limitations of the singular technology. In contrast, through the employment of the system 100, the control engine 136 of the MAL 102 can allocate a particular type of technology to each type of capability (e.g., via the configuration file). In this manner, rather that providing a system where all capabilities are rely on Glassfish, the capabilities can be distributed throughout different platforms. For instance, the control engine 136 can cause instantiation of high tempo mission critical capabilities on DDS, and cause instantiation of high tempo non-mission critical capabilities on JMS. Additionally, the control engine 136 of the MAL 102 can eliminate use of ORACLE® databases and use Data Grids for slow tempo operational data to reduce costs and/or resource use.

Moreover, by implementation of the middleware APIs, the MAL 102 supports the development of any type of "glueware" to connect disparate technologies. For example, JMS is not a wire standard. Accordingly, an application waiting to receive a message on ActiveMQ will not receive a message that was published to OpenMQ. The JMS API 118 facilitates the bridging so that a message can be subscribed from OpenMQ and published to ActiveMQ. A similar pattern emerges that allows the Data Grid API 130 to send and/or receive messages between a Data Grid of a given vendor type and a Data Grid of another vendor type since Data Grids do not have an API or wire standard.

Additionally, the MAL 102 can be employed in many industries, including, but not limited to the Unmanned Systems domain. In general, the MAL 102 can be used to send any data across any domain. For example, the MAL 102 can be used in an e-commerce environment to send and receive order data. Additionally, in another example the MAL 102 can be used in a biometric environment to facilitate the exchange of biometric data.

As noted, the MAL 102 can be employed in the Unmanned Systems domain, including domains that deploy UAVs. In such a situation, the Data Grid API 130 of the second level of the system 100 can be employed to facilitate the processing and management of Digital Terrain Elevation Data (DTED). For instance, a mission specific application 138 can be programmed to process DTED data that can be employed extensively in mission planning to ensure that generated routes for UAVs do not fly into terrain obstructions (e.g., mountains). In conventional Unmanned Systems, prior to a mission, applications can take several days to pre-process DTED data as since such DTED data typically spans several terabytes. However, by employing the Data Grid API 130 and a Map/Reduce paradigm, the system 100 can parallelize the computations in calculating line of sight and intersection data that significantly reduces the time needed to feed calculated data to mission planners from days to hours or even minutes.

For example, in a typical Map/Reduce paradigm, one or more of the data grid services 134 can be employed to store DTED data. As used herein, DTED refers to a standard of digital datasets which consists of a matrix of terrain elevation values (e.g. a Digital Elevation Model). The DTED standard was originally developed to support aircraft radar simulation and prediction, and is also used by aircraft, including manned aircraft and unmanned aircraft vehicles (UAVs). In such a situation, the mission specific application 138 could be a server application that can request specific DTED data from the DTED services 134 via the data grid API 130. Additionally, the resultant server application (the mission specific application 138) can provide the DTED data to clients via a network on demand.

Moreover, through employment of the Data Grid API 130, an alternative method of serving DTED data to numerous clients can be easily derived and implemented by the MAL 102. Conventionally, a server application serving DTED data to clients requires a central database server to receive a request from a client, read the data from a mechanical disk (e.g., a hard drive), and send the data to the client. In contrast, by employing Data Grids (via the Data Grid API 132), the DTED data can be prepopulated into a specific Data Grid, such that the client employing DTED data can retrieve the data directly from the specific Data Grid, thereby obviating the need to query a central database server.

Using the Data Grid provides significant advantages over employment of the central database server. In particular, employing the Data Grid approach increases the speed of memory access over disk access and server node distribution. For example, each node in a data grid can store its data in its local memory (e.g., non-volatile flash memory or volatile random access memory). As a result, when a look-up or data access occurs, the look-up or data access executes at a much faster speed than reading from a mechanical disk, as a conventional DTED-serving approach would require. Additionally, Data Grids are designed to be distributed across multiple nodes on a network. Combined with inherent load balancing of the data grid technology and a Data Grid's ability to determine where a piece of data is held, the number of clients requesting data from any one node can be reduced (e.g., scaled down). As a result, the load on individual nodes of the Data Grid is decreased, removing a potential bottleneck and increasing per-client throughput.

The MAL 102 is extensible and as well as OS and hardware agnostic, supporting all programming languages and environments. For instance, the MAL 102 is designed to function in an embedded environment such as VxWorks onboard a UAV for management of flight controls or other time-critical capabilities.

Figure 16:
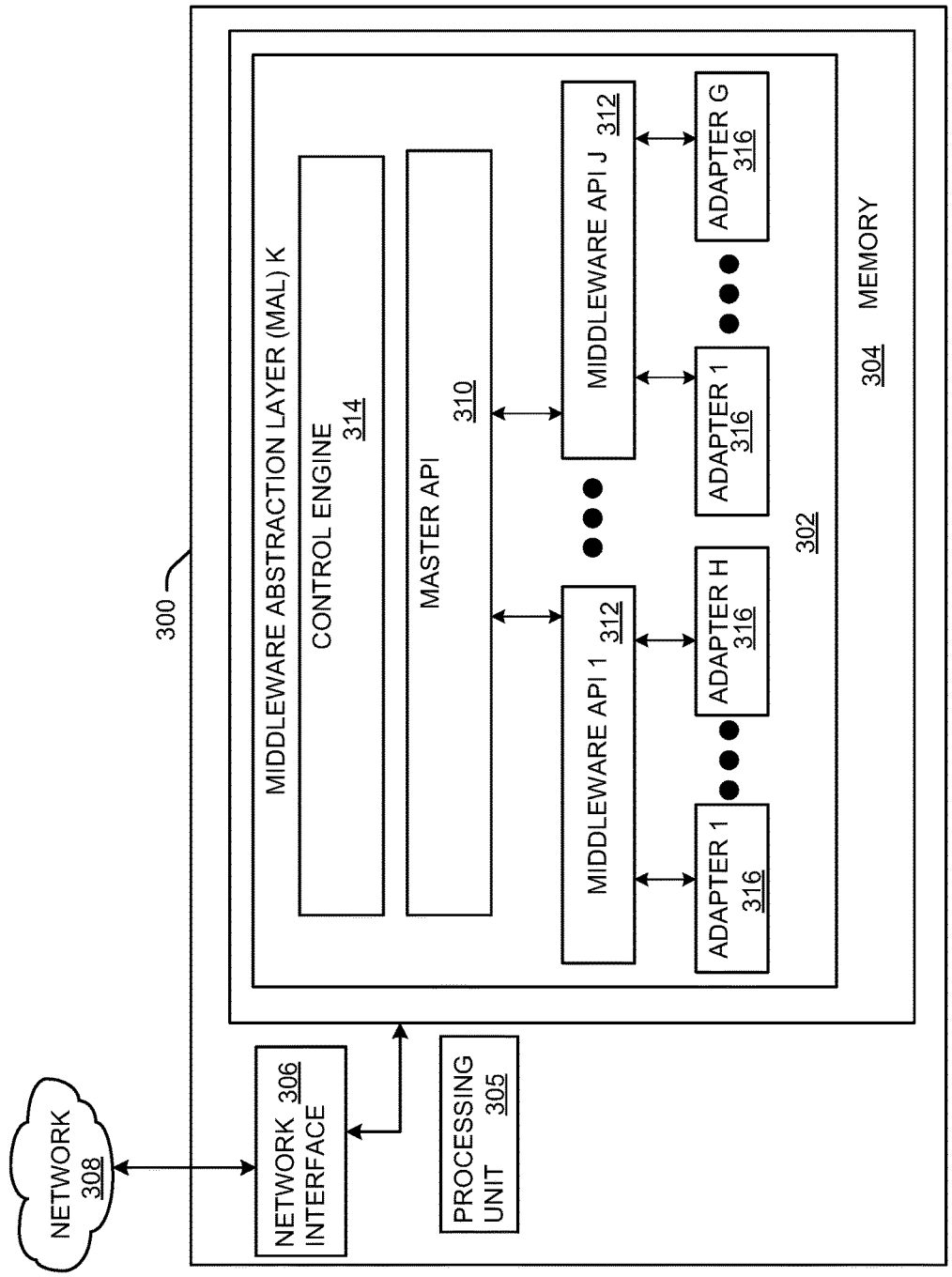
FIG. 16 illustrates an example of a system executing a MAL.

FIG. 16 illustrates an example of a system 300 for implementing a MAL 302. The MAL 302 can be implemented in a manner similar to the MAL 52 of FIG. 1. The system 300 can include a memory 304 that can store machine readable instructions. The memory 304 could be implemented, for example, as non-transitory computer readable media, such as volatile memory (e.g., random access memory), nonvolatile memory (e.g., a hard disk drive, a solid state drive, flash memory, etc.) or a combination thereof. The system 300 can also include a processing unit 305 to access the memory 304 and execute the machine-readable instructions. The processing unit 305 can include, for example, one or more processor cores. The system 300 can include a network interface 306 configured to communicate with a network 308. The network interface 306 could be implemented, for example, as a network interface card. The network 308 could be implemented, for example, as a private network (e.g., local area network or a carrier network) as a public network (e.g., the Internet) or a combination thereof (e.g., a virtual private network).

The system 300 could be implemented, for example in a computing cloud. In such a situation, features of the system 300, such as the processing unit 305, the network interface 306, and the memory 304 could be representative of a single instance of hardware or multiple instances of hardware with applications executing across the multiple of instances (i.e., distributed) of hardware (e.g., computers, routers, memory, processors, or a combination thereof). Alternatively, the system 300 could be implemented on a single dedicated computing node (e.g., a server, an end-user computer, a network appliance, etc.).

The MAL 302 can be stored in the memory 304. The MAL 302 can include a master API 310 that can interface with J number of middleware APIs 312, where J is an integer greater than or equal to one. The J number of middleware APIs 312 can be implemented in a manner similar to the N number of middleware APIs 56 of FIG. 1. For example, a first middleware API 312 can be configured as a TCP API (e.g., the TCP API 106 of FIG. 2), a second middleware API 312 can be configured as a UDP API (e.g., the UDP API 112 of FIG. 2) and a third middleware API 312 can be configured as a JMS API (e.g., the JMS API 118 of FIG. 2). Further, a fourth middleware API 312 can be configured as a DDS API 124 (e.g., the DDS API 124 of FIG. 2). Yet further, a fifth middleware API 312 can be configured as a Data Grid API (e.g., the Data Grid API 130 of FIG. 2).

Each middleware API 312 can provide resources that are sufficiently general to be implemented by any one of a corresponding set of adapters and services. Additionally, the master API 310 can provide resources that are sufficiently general to be implemented by any of the corresponding set of middleware APIs 312. That is, the master APIs 310 can be implemented in a manner similar to the master API 70 illustrated in FIG. 1.

A mission specific application (e.g., similar to the mission specific application 54 of FIG. 1) can provide a resource request (e.g., an API call) to the master API 310 via the network interface 306. The MAL 302 can include control engine 314. The control engine 314 can be implemented, for example, in a manner similar to the control engine 72 illustrated in FIG. 1. The control engine 314 can be configured to load an adapter 316 corresponding to the middleware API 312 of the MAL 302 to communicate with an instance of a service (e.g., the service 60) to implement the resource request. In FIG. 16, the first middleware API 312 is associated with H number of adapters 316 and the Jth middleware API 312 is associated with G number of adapters 316, where H and G are both integers greater than or equal to one. Each adapter 316 can communicate (e.g., via the network 308) with one or more instances of a specific type of service. Additionally, the master API 310 can forward the API call (or a series of API calls) corresponding to the resource request to the selected middleware API 312.

The selected middleware API 312 can forward the API call (or series of API calls) to the loaded adapter 316 that can generate a command for a particular instance of a service to execute the command. The service can provide a command response to the loaded adapter 316. The loaded adapater 316 can convert the command into an API response and forward the API response to the selected middleware API 312. The selected middleware API 312 can forward the API response to the master API 310. The master API 310 can provide the API response to the mission specific application as response to the resource request.

Figure 17:
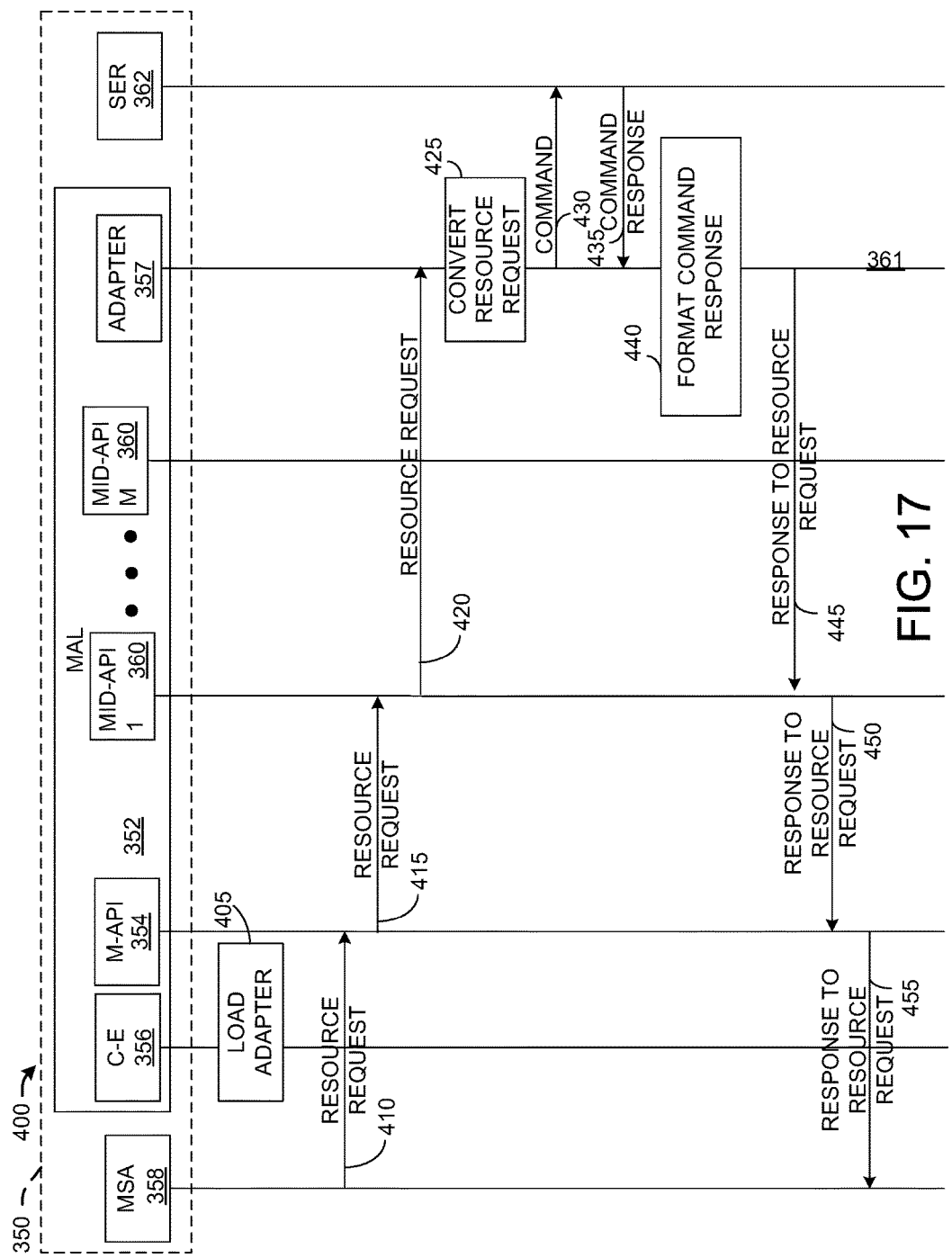
FIG. 17 illustrates a timing diagram of a system that implements a MAL.

FIG. 17 illustrates an example of a timing diagram for a system 350 that implements a MAL 352. The timing diagram depicts operations of a method 400 performed by the system 350. While, for purposes of simplicity of explanation, the example method 400 of FIG. 17 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

Each component of the system 350 could be implemented as software executing on one or more computing devices (e.g., in a stand-alone computing device or a cloud computing device). Moreover, in some examples, the components of the system 350 can communicate over a network. In other examples, some (or all) of the components can be integrated on a single computing device.

The MAL 352 can be implemented, for example, in a manner similar to the MAL 52 of FIG. 1, the MAL 102 of FIG. 2 and/or the MAL 302 of FIG. 16. The MAL 352 can include a master API 354 (labeled in FIG. 17 as "M-API") and a control engine 356 (labeled in FIG. 17 as "C-E"). The system 350 includes a mission specific application 358 (labeled in FIG. 17 as "MSA") that leverages the MAL 352.

In the method 400, at 405, the control engine 356 can load an adapter 357 (labeled in FIG. 17 as "ADAPTER") of the MAL to handle resources requests (e.g., during an initial set-up and configuration). The load of the adapter 357 can be similar to the method 200 illustrated and described with respect to FIG. 6. The MAL 352 includes M number of middleware APIs 360 (labeled in FIG. 17 as "MID-API") that are each configured to implement a common programming paradigm (e.g., the transport messaging paradigm, an integrated data computing mechanism paradigm or an integrated state-based data-centric paradigm). The adapter 357 is associated with a particular middleware API 360 (middleware API 1, in the example illustrated in FIG. 17). Additionally, the adapter 357 can issue commands (e.g., API calls) to a service 362 (labeled in FIG. 17 as "SER") of the system 350 implements commands requested by the adapter 357 for the particular middleware API 360. The service 362 is inclusive of an interface, such as a vendor/standard specific API.

At 410, the mission specific application 358 can issue a resource request (e.g., an API call) to the master API 354. At 415, the master API 354 can forward the resource request to a selected a middleware API 360 (middleware API 1 in the example method 400) from the M number of middleware APIs 360. The selection can be based, for example, on a predetermined configuration (e.g., a configuration file) during the initial set-up/configuration. At 420, the selected middleware API 360 (middleware API 1, in the present example) can forward the resource request to the adapter 361. At 425, the adapter 357 can convert the resource request (e.g., an API call) into a command (e.g., an API call) for the service 362. In some examples, the command may be a series of commands (API calls) needed to service the resource request.

At 430, the adapter 357 can issue the command to the service 362. At 435, the service 362 can generate a command response that is provided to the adapter 361.

At 440, adapter 357 can format (e.g., convert) the command response to generate a response for the resource request (the API call). At 445, a response to the resource request can be forwarded to the selected middleware API 360. At 450, the response to the resource request can be forwarded to the master API 354. At 455, the master API 354 can provide the response to the resource request (e.g., an API call response) to the mission specific application 358. The mission specific application 358 can consume the response to the resource request in due course.

In view of the foregoing structural and functional description, those skilled in the art will appreciate that portions of the systems and method disclosed herein may be embodied as a method, data processing system, or computer program product such as a non-transitory computer readable medium. Accordingly, these portions of the approach disclosed herein may take the form of an entirely hardware embodiment, an entirely software embodiment (e.g., in a non-transitory machine readable medium), or an embodiment combining software and hardware. Furthermore, portions of the systems and method disclosed herein may be a computer program product on a computer-usable storage medium having computer readable program code on the medium. Any suitable computer-readable medium may be utilized including, but not limited to, static and dynamic storage devices, hard disks, solid-state storage devices, optical storage devices, and magnetic storage devices.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processors of a general purpose computer, special purpose computer, or other programmable data processing apparatus (or a combination of devices and circuits) to produce a machine, such that the instructions, which execute via the one or more processors, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

What have been described above are examples. It is, of course, not possible to describe every conceivable combination of structures, components, or methods, but one of ordinary skill in the art will recognize that many further combinations and permutations are possible. Accordingly, the invention is intended to embrace all such alterations, modifications, and variations that fall within the scope of this application, including the appended claims. Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A non-transitory machine readable medium having machine readable instructions, the machine readable instructions comprising a middleware abstraction layer (MAL) comprising:
   a plurality of middleware application programming interfaces (APIs), wherein each of the plurality of middleware APIs are configured to implement a common programming paradigm for a plurality of different service platforms, wherein a given middleware API of the plurality of middleware APIs is a Data Grid API configured to access, modify, and/or transfer Data Grid data;
   a master API configured to provide a plurality of resources for a mission specific application, wherein each of the plurality of resources is mapped in a registry to an API call to each of the plurality of middleware APIs;
   wherein a given resource of the plurality of resources includes at least one of a function that comprises a function call to a first middleware API of the plurality of middleware APIs and a function call to a second middleware API of the plurality of middleware APIs; and
   a control engine configured to load at least two adapters for a selected a middleware API of the plurality of middleware APIs to service a resource request from the mission specific application, wherein the selection includes examining a configuration file to determine an appropriate middleware API to handle the resource request, wherein the control engine loads a first Data Grid adapter and a second Data Grid adapter for the Data Grid API, wherein the first Data Grid adapter communicates with a first Data Grid service from a first Data Grid vendor to access, modify, and/or transfer Data Grid data stored at a site of the first Data Grid vendor and the second Data Grid adapter communicates with a second Data Grid service from a second Data Grid vendor to access, modify, and/or transfer Data Grid data stored at a plurality of sites of the second Data Grid vendor.

2. The medium of claim 1, wherein the master API is configured to provide a response to the resource request to the mission specific application.

3. The medium of claim 1, wherein a first middleware API of the plurality of middleware APIs is a Transmission Control Protocol (TCP) API, a second middleware API of the plurality of middleware APIs is a User Datagram Protocol (UDP) API and a third middleware API of the plurality of middleware APIs-is a Java Messaging Service (JMS) API.

4. The medium of claim 1, wherein the Data Grid data stored by the first and second Data Grid services is Digital Terrain and Elevation data (DTED).

5. The medium of claim 1, wherein another middleware API of the plurality of middleware APIs is a Data Distribution Service (DDS) API that interfaces with a first DDS adapter that communicates with a first DDS from a first DDS vendor and a second DDS adapter that communicates with a second DDS from a second DDS vendor.

6. The medium of claim 1, wherein another resource of the plurality of resources is mapped to a plurality of sets of API calls for each respective middleware API.

7. The medium of claim 1, wherein the adapter for the selected middleware API is further configured to convert the resource request into a plurality of API calls to the service.

8. The medium of claim 1, wherein the configuration file defines a particular middleware API of the plurality of middleware APIs to handle a particular resource request of the plurality of resource requests.

9. The medium of claim 1, wherein the selecting by the control engine is further based on an accessibility of each of the plurality of middleware APIs.

10. The medium of claim 1, wherein the at least two adapters are further configured to cause instantiation of multiple instances of the same service that execute concurrently.

11. The medium of claim 1,
    wherein a first middleware API of the plurality of middleware APIs is configured to transfer data in a hub-spoke model;
    wherein a second middleware API of the plurality of middleware APIs is configured to transfer data in a Peer-to-Peer model; and
    wherein a third middleware API of the plurality of middleware APIs is configured to transfer data in a shared memory model; and
    wherein a fourth middleware API of the plurality of middleware APIs is configured to implement a Java Messaging Service.

12. The medium of claim 1, wherein a first administrative domain is configured to regulate access, modification, and transfer of the Data Grid data stored at the site of the first Data Grid vendor based on a first set of security restrictions placed on the Data Grid data at the site of the first Data Grid vendor, wherein a second administrative domain is configured to regulate access, modification, and transfer of the Data Grid data stored at the plurality of sites of the second Data Grid vendor based on a second set of security restrictions placed on the Data Grid data at the plurality of sites of the second Data Grid vendor.

13. A system comprising:
    a non-transitory memory to store machine readable instructions; and
    a processing unit to access the memory and execute the machine readable instructions, the machine readable instructions comprising a middleware abstraction layer (MAL), the MAL comprising:
       a plurality of middleware application programming interfaces (APIs) that are each configured to implement a common programming paradigm for a plurality of different services, wherein a given middleware API of the plurality of middleware APIs is configured to provide a Data Grid API for a plurality of different Data Grid services provided by a plurality of different Data Grid vendors, wherein the Data Grid API is configured to access, modify, and/or transfer Data Grid data, wherein at least one of the plurality of Data Grid vendors stores the Data Grid data at a site of the respective one of the plurality of Data Grid vendors, wherein another one of the plurality of Data Grid vendors stores the Data Grid data at a plurality of sites of the respective other one of the plurality of Data Grid vendors, wherein the common programming paradigm includes a transport messaging paradigm, an integrated computing mechanism paradigm and an integrated state-based data-centric paradigm;

a master API configured to:

provide a plurality of resources accessible by a resource request, wherein each of the plurality of resources characterizes a generalized function that is mapped in a registry to an API call for each of the plurality of middleware APIs;

wherein a given resource of the plurality of resources includes at least one of a function that comprises a function call to a first middleware API of the plurality of middleware APIs and a function call to a second middleware API of the plurality of middleware APIs; and a control engine configured to load an adapter for a selected middleware API of the plurality of middleware APIs to service a resource request from a mission specific application.

14. The system of claim 13, wherein the selecting is based on a predetermined configuration.

15. The system of claim 13, wherein another middleware API of the plurality of middleware APIs is configured to provide an API for a plurality of different data distribution services (DDSs).

16. The medium of claim 13, wherein an administrative domain of each of the plurality of different Data Grid vendors is configured to regulate access, modification, and transfer of the Data Grid data stored based on one of a plurality of sets of security restrictions placed on the Data Grid data, wherein each of the plurality of different Data Grid vendors place a different one of the plurality of sets of security restrictions on the Data Grid data.

17. A method comprising:

loading, at a middleware abstraction layer (MAL) executing on one or more computing devices, an adapter of the MAL for a particular middleware application programming interface (API) of a plurality of middleware APIs that each implement a multiple versions of a common programming paradigm on corresponding services, wherein the selecting is based on a configuration file;

receiving, at the MAL, a resource request;

converting, at the adapter of the MAL, the resource request into an API call for a particular service of the corresponding services;

generating, at the adapter of the MAL, a response for the resource request in response to an API call response from the particular service; and wherein a given resource of the plurality of resources includes at least one of a function that comprises a function call to a first middleware API of the plurality of middleware APIs and a function call to a second middleware API of the plurality of middleware APIs, wherein a given middleware API of the plurality of middleware APIs is configured to provide a Data Grid API for a plurality of different Data Grid services provided by a plurality of different Data Grid vendors, wherein the Data Grid API is configured to access, modify, and/or transfer Data Grid data, wherein at least one of the plurality of Data Grid vendors stores the Data Grid data at a site of the respective one of the plurality of Data Grid vendors, wherein another one of the plurality of Data Grid vendors stores the Data Grid data at a plurality of sites of the respective other one of the plurality of Data Grid vendors.

18. The method of claim 17, wherein the common programming paradigms includes a transport messaging paradigm, and at least one of an integrated data computing mechanism paradigm and an integrated state-based data-centric paradigm.

19. The method of claim 17, wherein the selecting is further based on an accessibility of the particular middleware API.

20. The medium of claim 17, wherein an administrative domain of each of the plurality of different Data Grid vendors is configured to regulate access, modification, and transfer of the Data Grid data stored based on one of a plurality of sets of security restrictions placed on the Data Grid data, wherein each of the plurality of different Data Grid vendors place a different one of the plurality of sets of security restrictions on the Data Grid data.

* * * * *